US006210801B1

(12) United States Patent
Luo et al.

(10) Patent No.: US 6,210,801 B1
(45) Date of Patent: Apr. 3, 2001

(54) LYOCELL FIBERS, AND COMPOSITIONS FOR MAKING SAME

(75) Inventors: Mengkui Luo, Tacoma; Vincent A. Roscelli, Edgewood; Amar N. Neogi, Seattle; James E. Sealey, II, Federal Way; Richard A. Jewell, Bellevue, all of WA (US)

(73) Assignee: Weyerhaeuser Company, Federal Way, WA (US)

( * ) Notice: Subject to any disclaimer, the term of this patent is extended or adjusted under 35 U.S.C. 154(b) by 0 days.

(21) Appl. No.: 09/256,197

(22) Filed: Feb. 24, 1999

Related U.S. Application Data

(63) Continuation-in-part of application No. 09/185,423, filed on Nov. 3, 1998, which is a continuation-in-part of application No. 09/039,737, filed on Mar. 16, 1998, which is a continuation-in-part of application No. 08/916,652, filed on Aug. 22, 1997, now abandoned.
(60) Provisional application No. 60/023,909, filed on Aug. 23, 1996, and provisional application No. 60/024,462, filed on Aug. 23, 1996.

(51) Int. Cl.⁷ .................................................. B32B 23/00
(52) U.S. Cl. ......................... 428/393; 428/357; 428/364
(58) Field of Search ................................. 428/393, 357, 428/364

(56) References Cited

U.S. PATENT DOCUMENTS

| | | |
|---|---|---|
| 2,978,446 | 4/1961 | Battista et al. . |
| 3,023,104 | 2/1962 | Battista . |
| 3,141,875 | 7/1964 | Battista et al. . |
| 3,251,824 | 5/1966 | Battista . |
| 3,255,071 | 6/1966 | Kleinert . |
| 3,388,119 | 6/1968 | Cruz . |
| 3,539,365 | 11/1970 | Durand et al. . |
| 3,652,385 | * 3/1972 | Noreus et al. .......................... 162/23 |
| 3,974,251 | 8/1976 | Cremer et al. . |

(List continued on next page.)

FOREIGN PATENT DOCUMENTS

| | | |
|---|---|---|
| 0 785 304 A2 | 7/1997 | (EP) . |
| 2735794 A1 | 12/1996 | (FR) . |
| 2 337 957 | 8/1999 | (GB) . |

(List continued on next page.)

OTHER PUBLICATIONS

Author unknown, "Meltblown Process," "Meltblown Markets," "Meltblown vs.Competitive Technologies," pp. 7–26, undated.

"Dissolving Pulping Conditions," *Pulp and Paper Manufacture*, 3rd Edition, 4:229–243, Ingruber O.V. et al. Eds., Joint Textbook Committe of the Paper Industry publishers undated.

Balk, H. et al., "Use of Spinbonding and Melt Blown Microfiber Technology for Filter Media," pp. 287–297, TAPPI Proceedings, Nonwoven Conference, 1991.

(List continued on next page.)

*Primary Examiner*—William Krynski
*Assistant Examiner*—J. M. Gray
(74) *Attorney, Agent, or Firm*—Christensen O'Connor Johnson Kindness PLLC

(57) ABSTRACT

The present invention provides compositions, useful for making lyocell fibers, having a high hemicellulose content, a low lignin content and including cellulose that has a low average degree of polymerization (D.P.). Further, the present invention provides processes for making compositions, useful for making lyocell fibers, having a high hemicellulose content, a low lignin content and including cellulose that has a low average degree of polymerization. The present invention also provides lyocell fibers containing a high proportion of hemicellulose. Further, the lyocell fibers of the present invention have enhanced dye-binding properties and a reduced tendency to fibrillate.

29 Claims, 17 Drawing Sheets

U.S. PATENT DOCUMENTS

| | | |
|---|---|---|
| 4,142,913 | 3/1979 | McCorsley et al. . |
| 4,144,080 | 3/1979 | McCorsley . |
| 4,145,532 | 3/1979 | Franks et al. . |
| 4,159,345 | 6/1979 | Takeo et al. . |
| 4,196,282 | 4/1980 | Franks et al. . |
| 4,211,574 | 7/1980 | McCorsley et al. . |
| 4,246,221 | 1/1981 | McCorsley . |
| 4,256,613 | 3/1981 | Franks et al. . |
| 4,290,815 | 9/1981 | Henry . |
| 4,324,593 | 4/1982 | Varga . |
| 4,416,698 | 11/1983 | McCorsley . |
| 4,426,228 | 1/1984 | Brandner et al. . |
| 4,581,072 | 4/1986 | Laity . |
| 4,634,470 | 1/1987 | Kamide et al. . |
| 5,094,690 | 3/1992 | Zikeli et al. . |
| 5,189,152 | 2/1993 | Hinterholzer et al. . |
| 5,216,144 | 6/1993 | Eichinger et al. . |
| 5,277,857 | 1/1994 | Nicholson et al. . |
| 5,310,424 | 5/1994 | Taylor . |
| 5,330,567 | 7/1994 | Zikeli et al. . |
| 5,362,867 | 11/1994 | Chin et al. . |
| 5,370,322 | 12/1994 | Gray et al. . |
| 5,401,304 | 3/1995 | Wykes et al. . |
| 5,401,447 | 3/1995 | Matsui et al. . |
| 5,403,530 | 4/1995 | Taylor . |
| 5,413,631 | 5/1995 | Gray et al. . |
| 5,417,909 | 5/1995 | Michels et al. . |
| 5,421,525 | 6/1995 | Gray et al. . |
| 5,453,194 | 9/1995 | Klein . |
| 5,486,230 | 1/1996 | Kalt et al. . |
| 5,507,983 | 4/1996 | Sellars et al. . |
| 5,520,869 | 5/1996 | Taylor . |
| 5,527,178 | 6/1996 | White et al. . |
| 5,540,874 | 7/1996 | Fukui et al. . |
| 5,543,101 | 8/1996 | Ruf et al. . |
| 5,556,452 | 9/1996 | Kalt et al. . |
| 5,562,739 | 10/1996 | Urben . |
| 5,580,354 | 12/1996 | Taylor . |
| 5,580,356 | 12/1996 | Taylor . |
| 5,582,783 | 12/1996 | Zikeli et al. . |
| 5,582,786 | 12/1996 | Brunskill et al. . |
| 5,582,843 | 12/1996 | Sellars et al. . |
| 5,587,238 | 12/1996 | Meraldi et al. . |
| 5,589,125 | 12/1996 | Zikeli et al. . |
| 5,591,388 | 1/1997 | Sellars et al. . |
| 5,593,705 | 1/1997 | Schilo et al. . |
| 5,601,767 | 2/1997 | Firgo et al. . |
| 5,601,771 | 2/1997 | Ruf . |
| 5,603,883 | 2/1997 | Zikeli . |
| 5,605,567 | 2/1997 | Lancaster . |
| 5,607,639 | 3/1997 | Zikeli et al. . |
| 5,609,957 | 3/1997 | Page et al. . |
| 5,618,483 | 4/1997 | Weigel et al. . |
| 5,626,810 | 5/1997 | Zikeli et al. . |
| 5,628,941 | 5/1997 | Kalt et al. . |
| 5,634,914 | 6/1997 | Wilkes et al. . |
| 5,639,484 | 6/1997 | White et al. . |
| 5,651,794 | 7/1997 | Taylor . |
| 5,652,001 | 7/1997 | Perry et al. . |
| 5,653,931 | 8/1997 | Eibl et al. . |
| 5,656,224 | 8/1997 | Zikeli et al. . |
| 5,662,858 | 9/1997 | Firgo et al. . |
| 5,676,795 | 10/1997 | Wizani et al. . |
| 5,679,146 | 10/1997 | Kalt et al. . |
| 5,690,874 | 11/1997 | Bell et al. . |
| 5,709,716 | 1/1998 | Taylor . |
| 5,725,821 | 3/1998 | Gannon et al. . |
| 5,759,210 | 6/1998 | Potter et al. . |
| 5,760,211 | 6/1998 | Schleicher et al. . |
| 5,766,530 | 6/1998 | Kalt et al. . |
| 5,779,737 | 7/1998 | Potter et al. . |
| 5,788,939 | 8/1998 | Mulleder et al. . |
| 5,795,522 | 8/1998 | Firgo et al. . |
| 6,042,769 | * 3/2000 | Gannon et al. ............ 264/203 |

FOREIGN PATENT DOCUMENTS

| | | |
|---|---|---|
| 6-220213 | 8/1994 | (JP) . |
| 623 4881 | 8/1994 | (JP) . |
| 6-16222 | 8/1995 | (JP) . |
| WO 94/28218 | 12/1994 | (WO) . |
| WO 95/21901 | 8/1995 | (WO) . |
| WO 95/33883 | 12/1995 | (WO) . |
| WO 95/35399 | 12/1995 | (WO) . |
| WO 95/35400 | 12/1995 | (WO) . |
| WO 96/12063 | 4/1996 | (WO) . |
| WO 96/25552 | 8/1996 | (WO) . |
| WO 96/27700 | 9/1996 | (WO) . |
| WO 97/15713 | 5/1997 | (WO) . |
| WO 97/30196 | 8/1997 | (WO) . |
| WO 98/02662 | 1/1998 | (WO) . |
| WO 98/22642 | 5/1998 | (WO) . |
| WO 98/26122 | 6/1998 | (WO) . |
| WO 98/30740 | 7/1998 | (WO) . |
| WO 99/16960 | 4/1999 | (WO) . |
| WO 99/47733 | 9/1999 | (WO) . |

OTHER PUBLICATIONS

Boman, R. et al., "Transition Metal Removal Before A (PO) Stage in ECF Sequences," International Pulp Bleaching Conference, 1996.

Bouchard, J. et al., "A Comparison Between Acid Treatment and Chelation Prior to Hydrogen Peroxide Bleaching of Kraft Pulps," Pulp and Paper Research Institute of Canada undated.

Chanzy, H. et al., "Dissolution and Spinning of Exploded Wood in Amine Oxide Systems," *Wood and Cellulosics,* pp. 573–579, editors Kennedy, J.F. et al., Ellis Harwood Publishers undated.

Chanzy, H. et al., "Spinning of Exploded Wood from Amine Oxide Solutions," *Polymer Communications,*27:171–172, 1986.

Cole, D.J., "Courtaulds Tencel Fibre in Apparel Fabrics," *Courtaulds Fibres,* May, 1992.

Eichinger, D. et al., "Lenzing Lyocell—An Interesting Cellulose Fibre for the Textile Industry," talk held at 34th IFC, Dornbirn, 1995.

Gurnagul, N. et al., "The Effect of Cellulose Degradation on the Strength of Wood Pulp Fibres," Pulp and Paper Research Institute of Canada undated.

Hill, R.T. et al., "Transition Metal Control for Peroxygen Bleaching a Sulfite Pulp," pp. 489–500, TAPPI Pulping Conference, Houston, Texas, 1994.

Humphrey, A.E., "The Hydrolysis of Cellulosic Materials to Useful Products," pp. 25–53, *Hydrolysis of Cellulose,* 1978.

Johnson, P., "Courtaulds Lyocell—A Cellulosic Fibre for Special Papers and Nonwovens," pp. 245–248, TAPPI Nonwovens Conference, 1996.

Kamide, K. et al., "Structural Change in Alkali–Soluble Cellulose Solid During Its Dissolution Into Aqueous Alkaline Solution," *Cellulose Chem. Technol.,* 24:23–31, 1990.

Kamide, K., et al., "Dissolution of Natural Cellulose into Aqueous Alkali Solution: Role of Super–Molecular Structure of Cellulose," *Polymer Journal* 24:71–86, 1992.

Kruger, I.R. et al., "Cellulosic Filament Yarn From the NMMO Process," Presentation: Int. Chemiefaser–Tagung, Dornbirn, 1993.

Lipinsky, E.S., "Perspectives on Preparation of Cellulose for Hydrolysis," pp. 1–23, *Hydrolysis of Cellulose,* 1978.

Luo, M., "Characterization of Cellulose and Galactomannan Blends from the N–Methylmorpholine N–Oxide/Water Solvent System," State University of New York, Syracuse, New York, Apr., 1994.

Marini et al., "Lenzing Lyocell," Presentation: Int. Chemiefaser–Tagung, Dornbirn, 1993.

Michels, C. et al., "The Aminoxide Process Developed in the TITK," Thuringisches Institut fur textil– und Kunstsoff–Forschung Talk, Rudolstadt, Sep., 1994.

Mieck, K. et al., "Examination of the Fibrillation Tendency of Cellulosic Man–Made Spun Fibres with Different Fibre Formation Mechanisms," Presentation: Int. Chemiefaser–Tagung, Dornbirn, 1993.

Mortimer, S.A. et al., "Methods for Reducing the Tendency of Lyocell Fibers to Fibrillate," pp. 305–316, Centre de Recherches sur les Macromolecules Vegetales, Grenoble, France, Mar., 1995.

Nicolai, M. et al., "Textile Crosslinking Reactions to Reduce the Fibrillation Tendency of Lyocell Fibers," *Textile Res. J.* 66(9):575–580, 1996.

Robert, A. et al., "Possible Uses of Oxygen in Bleaching Cellulose Pulps. (2). Bleaching Cellulose Pulps Previously Treated With Oxygen," *ATIP* Bulletin 18, 4:166–176, 1964.

Trimble, L.E., "The Potential for Meltblown", pp. 139–149, presentation undated.

Woodings, C.R., "Fibers (Regenerated Cellulosics)," Encyclopedia of Chemical Technology, Fourth Edition, 10:696–726, John Wiley & Sons publishers undated.

Yamashiki, T. et al., "Characterisation of Cellulose Treated by the Steam Explosion Method. Part 1: Influence of Cellulose Resources on Changes in Morphology, Degree of Polymerisation, Solubility and Solid Structure," *British Polymer Journal* 22:73–83, 1990.

Yamashiki, T. et al., "Characterisation of Cellulose Treated by the Steam Explosion Method. Part 2: Effect on Treatment Conditions on Changes in Morphology, Degree of Polymerisation, Solubility in Aqueous Sodium Hydroxide and Supermolecular Structure of Soft Wood Pulp During Steam Explosion," *British Polymer Journal* 22:121–128, 1990.

Yamashiki, T. et al., "Characterisation of Cellulose Treated by the Steam Explosion Method. Part 3: Effect of Crystal Forms (Cellulose I, II and III) of Original Cellulose on Changes in Morphology, Degree of Polymerisation, Solubility and Supermolecular Structure by Steam Explosion," *British Polymer Journal* 22:201–212, 1990.

Yuan, Z. et al., "The Role of Transition Metal Ions During Peracetic Acid Bleaching of Chemical Pulps," pp. 1–8, 83rd Annual Meeting, Technical Section CPPA undated.

Zhang, X. et al., "The Role of Transition Metal Species in Delignification With Distilled Peracetic Acid," *J. Wood Chemistry and Technology* 18(3):253–266, 1998.

* cited by examiner

LYOCELL FIBERS, AND COMPOSITIONS FOR MAKING SAME

This application is a continuation-in-part of application Ser. No. 09/185,423, filed Nov. 3, 1998, now pending which is a continuation-in-part of application Ser. No. 09/039,737, filed Mar. 16, 1998, now pending which is a continuation-in-part of application Ser. No. 08/916,652, filed Aug. 22, 1997, now abandoned, which claimed priority from Provisional Applications Ser. Nos. 60/023,909 and 60/024,462, both filed Aug. 23, 1996.

FIELD OF THE INVENTION

The present invention is directed to compositions useful for making lyocell fibers, to methods of making compositions useful for making lyocell fibers, and to lyocell fibers made from the compositions of the present invention. In particular, the present invention is directed to compositions having a high hemicellulose content, a low lignin content, a low copper number and including cellulose having a low average degree of polymerization.

BACKGROUND OF THE INVENTION

Cellulose is a polymer of D-glucose and is a structural component of plant cell walls. Cellulose is especially abundant in tree trunks from which it is extracted, converted into pulp, and thereafter utilized to manufacture a variety of products. Rayon is the name given to a fibrous form of regenerated cellulose that is extensively used in the textile industry to manufacture articles of clothing. For over a century strong fibers of rayon have been produced by the viscose and cuprammonium processes. The latter process was first patented in 1890 and the viscose process two years later. In the viscose process cellulose is first steeped in a mercerizing strength caustic soda solution to form an alkali cellulose. This is reacted with carbon disulfide to form cellulose xanthate which is then dissolved in dilute caustic soda solution. After filtration and deaeration the xanthate solution is extruded from submerged spinnerets into a regenerating bath of sulfuric acid, sodium sulfate, zinc sulfate, and glucose to form continuous filaments. The resulting so-called viscose rayon is presently used in textiles and was formerly widely used for reinforcing rubber articles such as tires and drive belts.

Cellulose is also soluble in a solution of ammoniacal copper oxide. This property forms the basis for production of cuprammonium rayon. The cellulose solution is forced through submerged spinnerets into a solution of 5% caustic soda or dilute sulfuric acid to form the fibers, which are then decoppered and washed. Cuprammonium rayon is available in fibers of very low deniers and is used almost exclusively in textiles.

The foregoing processes for preparing rayon both require that the cellulose be chemically derivatized or complexed in order to render it soluble and therefore capable of being spun into fibers. In the viscose process, the cellulose is derivatized, while in the cuprammonium rayon process, the cellulose is complexed. In either process, the derivatized or complexed cellulose must be regenerated and the reagents that were used to solubilize it must be removed. The derivatization and regeneration steps in the production of rayon significantly add to the cost of this form of cellulose fiber. Consequently, in recent years attempts have been made to identify solvents that are capable of dissolving underivatized cellulose to form a dope of underivatized cellulose from which fibers can be spun.

One class of organic solvents useful for dissolving cellulose are the amine-N oxides, in particular the tertiary amine-N oxides. For example, Graenacher, in U.S. Pat. No. 2,179,181, discloses a group of amine oxide materials suitable as solvents. Johnson, in U.S. Pat. No. 3,447,939, describes the use of anhydrous N-methylmorpholine-N-oxide (NMMO) and other amine N-oxides as solvents for cellulose and many other natural and synthetic polymers. Franks et al., in U.S. Pat. Nos. 4,145,532 and 4,196,282, deal with the difficulties of dissolving cellulose in amine oxide solvents and of achieving higher concentrations of cellulose.

Lyocell is an accepted generic term for a fiber composed of cellulose precipitated from an organic solution in which no substitution of hydroxyl groups takes place and no chemical intermediates are formed. Several manufacturers presently produce lyocell fibers, principally for use in the textile industry. For example, Acordis, Ltd. presently manufactures and sells a lyocell fiber called TENCEL® fiber.

Currently available lyocell fibers suffer from one or more disadvantages. One disadvantage of some lyocell fibers made presently is a function of their geometry which tends to be quite uniform, generally circular or oval in cross section and lacking crimp as spun. In addition, many current lyocell fibers have relatively smooth, glossy surfaces. These characteristics make such fibers less than ideal as staple fibers in woven articles since it is difficult to achieve uniform separation in the carding process and can result in non-uniform blending and uneven yarn.

In addition, fibers having a continuously uniform cross section and glossy surface produce yarns tending to have an unnatural, "plastic" appearance. In part to correct the problems associated with straight fibers, man-made staple fibers are almost always crimped in a secondary process prior to being chopped to length. Examples of crimping can be seen in U.S. Pat. Nos. 5,591,388 or 5,601,765 to Sellars et al. where a fiber tow is compressed in a stuffer box and heated with dry steam. Inclusion of a crimping step increases the cost of producing lyocell fibers.

Another widely-recognized problem associated with prior art lyocell fibers is fibrillation of the fibers under conditions of wet abrasion, such as might result during laundering. Fibrillation is defined as the splitting of the surface portion of a single fiber into smaller microfibers or fibrils. The splitting occurs as a result of wet abrasion caused by attrition of fiber against fiber or by rubbing fibers against a hard surface. Depending on the conditions of abrasion, most or many of the microfibers or fibrils will remain attached at one end to the mother fiber. The microfibers or fibrils are so fine that they become almost transparent, giving a white, frosty appearance to a finished fabric. In cases of more extreme fibrillation, the microfibers or fibrils become entangled, giving the appearance and feel of pilling, i.e., entanglement of fibrils into small, relatively dense balls.

Fibrillation of lyocell fibers is believed to be caused by the high degree of molecular orientation and apparent poor lateral cohesion of microfibers or fibrils within the fibers. There is extensive technical and patent literature discussing the problem and proposed solutions. As examples, reference can be made to papers by Mortimer, S. A. and A. A. Péguy, *Journal of Applied Polymer Science*, 60:305–316 (1996) and Nicholai, M., A. Nechwatal, and K. P. Mieck, *Textile Research Journal* 66(9):575–580 (1996). The first authors attempt to deal with the problem by modifying the temperature, relative humidity, gap length, and residence time in the air gap zone between extrusion and dissolution. Nicholai et al. suggest crosslinking the fiber but note that ".

at the moment, technical implementation [of the various proposals] does not seem to be likely". A sampling of related United States patents includes those to Taylor, U.S. Pat. Nos. 5,403,530, 5,520,869, 5,580,354, and 5,580,356; Urben, U.S. Pat. No. 5,562,739; and Weigel et al. U.S. Pat. No. 5,618,483. These patents in part relate to treatment of the fibers with reactive materials to induce surface modification or crosslinking. Enzymatic treatment of yarns or fabrics is currently the preferred way of reducing problems caused by fibrillation; however, all of the treatments noted have disadvantages, including increased production costs.

Additionally, it is believed that currently available lyocell fibers are produced from high quality wood pulps that have been extensively processed to remove non-cellulose components, especially hemicellulose. These highly processed pulps are referred to as dissolving grade or high alpha (or high α) pulps, where the term alpha (or α) refers to the percentage of cellulose. Thus, a high alpha pulp contains a high percentage of cellulose, and a correspondingly low percentage of other components, especially hemicellulose. The processing required to generate a high alpha pulp significantly adds to the cost of lyocell fibers and products manufactured therefrom.

For example, in the Kraft process a mixture of sodium sulphide and sodium hydroxide is used to pulp the wood. Since conventional Kraft processes stabilize residual hemicelluloses against further alkaline attack, it is not possible to obtain acceptable quality dissolving pulps, i.e., high alpha pulps, through subsequent treatment in the bleach plant. In order to prepare dissolving type pulps by the Kraft process, it is necessary to give the chips an acidic pretreatment before the alkaline pulping stage. A significant amount of material, on the order of 10% of the original wood substance, is solubilized in this acid phase pretreatment. Under the prehydrolysis conditions, the cellulose is largely resistant to attack, but the residual hemicelluloses are degraded to a much shorter chain length and can therefore be removed to a large extent in the subsequent Kraft cook by a variety of hemicellulose hydrolysis reactions or by dissolution. Primary delignification also occurs during the Kraft cook.

The prehydrolysis stage normally involves treatment of wood at elevated temperature (150–180° C.) with dilute mineral acid (sulfuric or aqueous sulfur dioxide) or with water alone requiring times up to 2 hours at the lower temperature. In the latter case, liberated acetic acid from certain of the naturally occurring polysaccharides (predominantly the mannans in softwoods and the xylan in hardwoods) lowers the pH to a range of 3 to 4.

While the prehydrolysis can be carried out in a continuous digester, typically the prehydrolysis is carried out in a batch digester. As pulp mills become larger and the demand for dissolving grade pulp increases, more batch digesters will be needed to provide prehydrolyzed wood. The capital cost of installing such digesters and the costs of operating them will contribute to the cost of dissolving grade pulps. Further, prehydrolysis results in the removal of a large amount of wood matter and so pulping processes that incorporate a prehydrolysis step are low yield processes.

Moreover, a relatively low copper number is a desirable property of a pulp that is to be used to make lyocell fibers because it is generally believed that a high copper number causes cellulose degradation during and after dissolution in an amine oxide solvent. The copper number is an empirical test used to measure the reducing value of cellulose. Further, a low transition metal content is a desirable property of a pulp that is to be used to make lyocell fibers because, for example, transition metals accelerate the degradation of cellulose and NMMO in the lyocell process.

Thus, there is a need for relatively inexpensive, low alpha pulps that can be used to make lyocell fibers, for a process for making the foregoing low alpha pulps, and for lyocell fibers from the foregoing low alpha pulp. Preferably the desired low alpha pulps will have a low copper number, a low lignin content and a low transition metal content. Preferably it will be possible to use the foregoing low alpha pulps to make lyocell fibers having a decreased tendency toward fibrillation and a more natural appearance compared to presently available lyocell fibers.

SUMMARY OF THE INVENTION

As used herein, the terms "composition(s) of the present invention", or "composition(s) useful for making lyocell fibers", or "composition(s), useful for making lyocell fibers," or "treated pulp" or "treated Kraft pulp" refer to pulp, containing cellulose and hemicellulose, that has been treated in order to reduce the average degree of polymerization (D.P.) of the cellulose without substantially reducing the hemicellulose content of the pulp. The compositions of the present invention preferably possess additional properties as described herein.

Accordingly, the present invention provides compositions useful for making lyocell fibers, or other molded bodies such as films, having a high hemicellulose content, a low lignin content and including cellulose that has a low average D.P. Preferably, the cellulose and hemicellulose are derived from wood, more preferably from softwood. Preferably, the compositions of the present invention have a low copper number, a low transition metal content, a low fines content and a high freeness. Compositions of the present invention may be in a form that is adapted for storage or transportation, such as a sheet, roll or bale. Compositions of the present invention may be mixed with other components or additives to form pulp useful for making lyocell molded bodies, such as fiber or films. Further, the present invention provides processes for making compositions, useful for making lyocell fibers, having a high hemicellulose content, a low lignin content and including cellulose that has a low average D.P. The present invention also provides lyocell fibers containing cellulose having a low average D.P., a high proportion of hemicellulose and a low lignin content. The lyocell fibers of the present invention also preferably possess a low copper number and a low transition metal content. In one embodiment, preferred lyocell fibers of the present invention possess a non-lustrous surface and a natural crimp that confers on them the appearance of natural fibers. Further, the preferred lyocell fibers of the present invention have enhanced dye-binding properties and a reduced tendency to fibrillate.

Compositions of the present invention can be made from any suitable source of cellulose and hemicellulose but are preferably made from a chemical wood pulp, more preferably from a Kraft softwood pulp, most preferably from a bleached, Kraft softwood pulp, which is treated to reduce the average D.P. of the cellulose without substantially reducing the hemicellulose content. Compositions of the present invention include at least 7% by weight hemicellulose, preferably from 7% by weight to about 30% by weight hemicellulose, more preferably from 7% by weight to about 20% by weight hemicellulose, most preferably from about 10% by weight to about 17% by weight hemicellulose, and cellulose having an average D.P. of from about 200 to about 1100, preferably from about 300 to about 1100, and more preferably from about 400 to about 700. A presently preferred composition of the present invention has a hemicellulose content of from about 10% by weight to about 17% by weight, and contains cellulose having an average D.P. of from about 400 to about 700. Hemicellulose content is measured by a proprietary Weyerhaeuser sugar content assay. Further, compositions of the present invention have a kappa number of less than 2, preferably less than 1. Most preferably compositions of the present invention contain no detectable lignin. Lignin content is measured using TAPPI Test T236om85.

Compositions of the present invention preferably have a unimodal distribution of cellulose D.P. values wherein the individual D.P. values are approximately normally distributed around a single, modal D.P. value, i.e., the modal D.P. value being the D.P. value that occurs most frequently within the distribution. The distribution of cellulose D.P. values may, however, be multimodal i.e., a distribution of cellulose D.P. values that has several relative maxima. A multimodal, treated pulp of the present invention might be formed, for example, by mixing two or more unimodal, treated pulps of the present invention that each have a different modal D.P. value. The distribution of cellulose D.P. values is determined by means of proprietary assays performed by Thuringisches Institut fur Textil-und Kunstoff Forschunge. V., Breitscheidstr. 97, D-07407 Rudolstadt, Germany. Preferably the compositions of the present invention have a reduced fines content, a freeness that is comparable to untreated pulp, and a length-weighted percentage of fibers, of length less than 0.2 mm, of less than about 4%.

Additionally, compositions of the present invention preferably have a copper number of less than about 2.0, more preferably less than about 1.1, most preferably less than about 0.7 as measured by Weyerhaeuser Test Method PPD3. Further, compositions of the present invention preferably have a carbonyl content of less than about 120 μmol/g and a carboxyl content of less than about 120 μmol/g. The carboxyl and carbonyl group content are measured by means of proprietary assays performed by Thuringisches Institut fur Textil-und Kunstoff Forschunge. V., Breitscheidstr. 97, D-07407 Rudolstadt, Germany.

Compositions of the present invention also preferably possess a low transition metal content. Preferably, the total transition metal content of the compositions of the present invention is less than 20 ppm, more preferably less than 5 ppm, as measured by Weyerhaeuser Test Number AM5-PULP-1/6010. The term "total transition metal content" refers to the combined amounts, measured in units of parts per million (ppm), of nickel, chromium, manganese, iron and copper. Preferably the iron content of the compositions of the present invention is less than 4 ppm, more preferably less than 2 ppm, as measured by Weyerhaeuser Test AM5-PULP-1/6010, and the copper content of the compositions of the present invention is preferably less than 1.0 ppm, more preferably less than 0.5 ppm, as measured by Weyerhaeuser Test AM5-PULP-1/6010.

Compositions of the present invention are readily soluble in amine oxides, including tertiary amine oxides such as NMMO. Other preferred solvents that can be mixed with NMMO, or another tertiary amine solvent, include dimethylsulfoxide (D.M.S.O.), dimethylacetamide (D.M.A.C.), dimethylformamide (D.M.F.) and caprolactan derivatives. Preferably, compositions of the present invention fully dissolve in NMMO in less than about 70 minutes, preferably less than about 20 minutes, utilizing the dissolution procedure described in Example 6 herein. The term "fully dissolve", when used in this context, means that substantially no undissolved particles are seen when a dope, formed by dissolving compositions of the present invention in NMMO, is viewed under a light microscope at a magnification of 40× to 70×.

The compositions of the present invention may be in a form, such as a sheet, a roll or a bale, that is adapted for convenient and economical storage and/or transportation. In a particularly preferred embodiment, a sheet of a composition of the present invention has a Mullen Burst Index of less than about 2.0 kN/g (kiloNewtons per gram), more preferably less than about 1.5 kN/g, most preferably less than about 1.2 kN/g. The Mullen Burst Index is determined using TAPPI Test Number T-220. Further, in a particularly preferred embodiment a sheet of a composition of the present invention has a Tear Index of less than 14 mNm$^2$/g, more preferably less than 8 mNm$^2$/g, most preferably less than 4 mNm$^2$/g. The Tear Index is determined using TAPPI Test Number T-220.

A first preferred embodiment of the treated pulp of the present invention is a treated Kraft pulp including at least 7% by weight hemicellulose, a copper number less than about 2.0 and cellulose having an average degree of polymerization of from about 200 to about 1100.

A second preferred embodiment of the treated pulp of the present invention is a treated Kraft pulp including at least 7% by weight hemicellulose, a kappa number less than two and cellulose having an average degree of polymerization of from about 200 to about 1100, the individual D.P. values of the cellulose being distributed unimodally.

A third preferred embodiment of the treated pulp of the present invention is a treated Kraft pulp including at least 7% by weight hemicellulose, cellulose having an average degree of polymerization of from about 200 to about 1100, a kappa number less than two and a copper number less than 0.7.

A fourth preferred embodiment of the treated pulp of the present invention is a treated Kraft pulp including at least 7% by weight hemicellulose, cellulose having an average degree of polymerization of from about 200 to about 1100, a kappa number less than two, an iron content less than 4 ppm and a copper content less than 1.0 ppm.

A fifth preferred embodiment of the treated pulp of the present invention is a treated Kraft pulp including at least 7% by weight hemicellulose, cellulose having an average degree of polymerization of less than 1100, and a lignin content of about 0.1 percent by weight.

In another aspect, the present invention provides lyocell fibers including at least about 5% by weight hemicellulose, preferably from about 5% by weight to about 27% by weight hemicellulose, more preferably from about 5% by weight to about 18% by weight hemicellulose, most preferably from about 10% by weight to about 15% by weight hemicellulose, and cellulose having an average D.P. of from about 200 to about 1100, more preferably from about 300 to about 1100, most preferably from about 400 to about 700. Additionally, preferred lyocell fibers of the present invention have a unimodal distribution of cellulose D.P. values, although lyocell fibers of the present invention may also have a multimodal distribution of cellulose D.P. values, i.e., a distribution of cellulose D.P. values that has several relative maxima. Lyocell fibers of the present invention having a multimodal distribution of cellulose D.P. values might be formed, for example, from a mixture of two or more unimodal, treated pulps of the present invention that each have a different modal D.P. value.

Preferred lyocell fibers of the present invention have a copper number of less than about 2.0, more preferably less than about 1.1, most preferably less than about 0.7 as measured by Weyerhaeuser Test Number PPD3. Further, preferred lyocell fibers of the present invention have a carbonyl content of less than about 120 µmol/g and a carboxyl content of less than about 120 µmol/g. The carboxyl and carbonyl group content are measured by means of proprietary assays performed by Thuringisches Institut fur Textil-und Kunstoff Forschunge. V., Breitscheidstr. 97, D-07407 Rudolstadt, Germany. Additionally, preferred lyocell fibers of the present invention have a total transition metal content of less than about 20 ppm, more preferably less than about 5 ppm, as measured by Weyerhaeuser Test Number AM5-PULP-1/6010. The term "total transition metal content" refers to the combined amount, expressed in units of parts per million (ppm), of nickel, chromium, manganese, iron and copper. Preferably the iron content of lyocell fibers of the present invention is less than about 4 ppm, more preferably less than about 2 ppm, as measured by Weyerhaeuser Test AM5-PULP-1/6010, and the copper content of lyocell fibers of the present invention is preferably less than about 1 ppm, more preferably less than about 0.5 ppm, as measured by Weyerhaeuser Test AM5-PULP-1/6010. Lyocell fibers of the present invention have a kappa number of less than 2.0, preferably less than 1.0.

In preferred embodiments lyocell fibers of the present invention have a pebbled surface and a non-lustrous appearance. Preferably the reflectance of a wet-formed handsheet made from lyocell fibers of the present invention is less than about 8%, more preferably less than 6%, as measured by TAPPI Test Method T480-om-92.

Additionally, lyocell fibers of the present invention preferably have a natural crimp of irregular amplitude and period that confers a natural appearance on the fibers. Preferably the crimp amplitude is greater than about one fiber diameter and the crimp period is greater than about five fiber diameters. Preferred embodiments of lyocell fibers of the present invention also possess desirable dye-absorptive capacity and resistance to fibrillation. Further, preferred embodiments of the lyocell fibers of the present invention also possess good elongation. Preferably, lyocell fibers of the present invention possess a dry elongation of from about 8% to about 17%, more preferably from about 13% to about 15%. Preferably, lyocell fibers of the present invention possess a wet elongation of from about 13% to about 18%. Elongation is measured by means of proprietary assays performed by Thuringisches Institut fur Textil-und Kunstoff Forschunge. V., Breitscheidstr. 97, D-07407 Rudolstadt, Germany.

A presently preferred lyocell fiber of the present invention includes cellulose from treated Kraft pulp having at least 5% by weight hemicellulose, cellulose having an average D.P. of 200 to 1100 and a kappa number of less than two.

In another aspect, the present invention provides processes for making compositions of the present invention that can, in turn, be formed into lyocell molded bodies, such as fibers or films. In a first embodiment, the present invention provides a process that includes contacting a pulp comprising cellulose and hemicellulose with an amount of a reagent sufficient to reduce the average D.P. of the cellulose to within the range of from about 200 to about 1100, preferably to within the range of from about 300 to about 1100, more preferably to within the range of from about 400 to about 700, without substantially reducing the hemicellulose content. This D.P. reduction treatment occurs after the pulping process and before, during or after the bleaching process, if a bleaching step is utilized. The reagent is preferably at least one member of the group consisting of acid, steam, alkaline chlorine dioxide, the combination of at least one transition metal and a peracid, preferably peracetic acid, and the combination of ferrous sulfate and hydrogen peroxide. Preferably the copper number of the treated pulp is reduced to a value less than about 2.0, more preferably less than about 1.1, most preferably less than about 0.7. The copper number is measured by Weyerhaeuser test PPD3.

Presently the most preferred acid is sulfuric acid. The acid, or combination of acids, is preferably utilized in an amount of from about 0.1% w/w to about 10% w/w in its aqueous solution, and the pulp is contacted with the acid for a period of from about 2 minutes to about 5 hours at a temperature of from about 20° C. to about 180° C.

When the reagent is steam, the steam is preferably utilized at a temperature of from about 120° C. to about 260° C., at a pressure of from about 150 psi to about 750 psi, and the pulp is exposed to the steam for a period of from about 0.5 minutes to about 10 minutes. Preferably the steam includes at least one acid. Preferably, the steam includes an amount of acid sufficient to reduce the pH of the steam to a value within the range of from about 1.0 to about 4.5.

When the reagent is a combination of at least one transition metal and peracetic acid, the transition metal(s) is present at a concentration of from about 5 ppm to about 50 ppm, the peracetic acid is present at a concentration of from about 5 mmol per liter to about 200 mmol per liter, and the pulp is contacted with the combination for a period of from about 0.2 hours to about 3 hours at a temperature of from about 40° C. to about 100° C.

When the reagent is a combination of ferrous sulfate and hydrogen peroxide, the ferrous sulfate is present at a concentration of from about 0.1 M to about 0.6 M, the hydrogen peroxide is present at a concentration of from about 0.1% v/v to about 1.5% v/v, and the pulp is contacted with the combination for a period of from about 10 minutes to about one hour at a pH of from about 3.0 to about 5.0.

Preferably the yield of the first embodiment of a process for making compositions of the present invention is greater than about 95%, more preferably greater than about 98%. The process yield is the dry weight of the treated pulp produced by the process divided by the dry weight of the starting material pulp, the resulting fraction being multiplied by one hundred and expressed as a percentage.

In another aspect of the present invention a process for making lyocell fibers includes the steps of (a) contacting a pulp including cellulose and hemicellulose with an amount of a reagent sufficient to reduce the average degree of polymerization of the cellulose to the range of from about 200 to about 1100, preferably to the range of from about 300 to about 1100, without substantially reducing the hemicellulose content; and (b) forming fibers from the pulp treated in accordance with step (a). The copper number of the treated pulp is preferably reduced to a value less than 2.0 prior to fiber formation. In accordance with this aspect of the present invention, the lyocell fibers are preferably formed by a process selected from the group consisting of melt blowing, centrifugal spinning, spun bonding and a dry jet/wet process.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
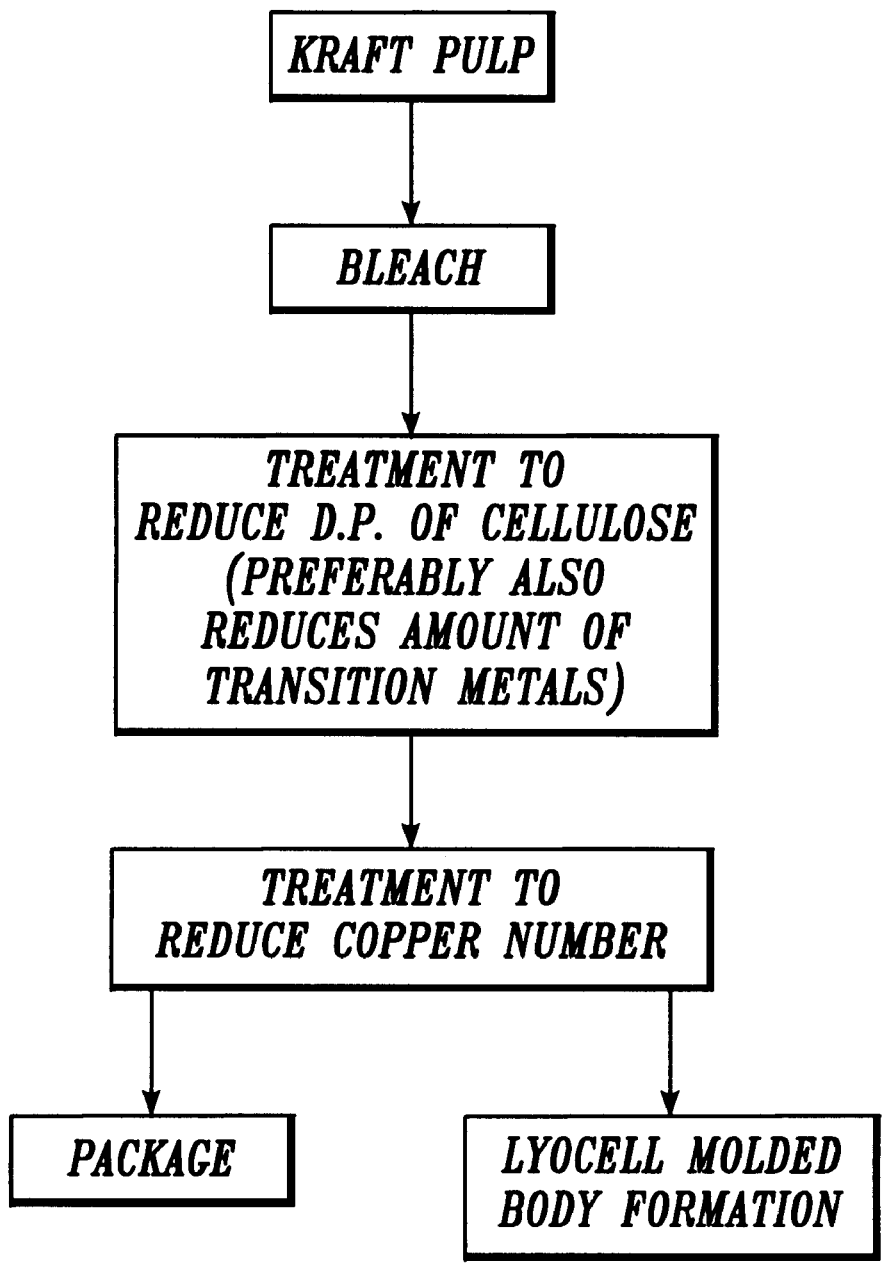
FIG. 1 is a block diagram of the presently preferred process for converting pulp, preferably Kraft pulp, to a composition of the present invention useful for making lyocell molded bodies.

Starting materials useful in the practice of the present invention contain cellulose and hemicellulose. Examples of starting materials useful in the practice of the present invention include, but are not limited to, trees and recycled paper. The starting materials used in the practice of the present invention, from whatever source, are initially converted to a pulp. The presently preferred starting material in the practice of the present invention is a chemical wood pulp, preferably a Kraft wood pulp, more preferably a bleached Kraft wood pulp. The discussion of the preferred embodiment of the present invention that follows will refer to the starting material as pulp or pulped wood, but it will be understood that the specific reference to wood as the source of starting material pulp in the following description of the preferred embodiment of the present invention is not intended as a limitation, but rather as an example of a presently preferred source of hemicellulose and cellulose.

In order to distinguish between the pulp that is useful as a starting material in the practice of the present invention (such as a bleached, Kraft wood pulp) and the compositions of the present invention (that are produced by treating the starting material, in order to reduce the average D.P. of the starting material cellulose without substantially reducing the hemicellulose content), the latter will be referred to as "composition(s) of the present invention", or "composition (s) useful for making lyocell fibers", or "composition(s), useful for making lyocell fibers," or "treated pulp" or "treated Kraft pulp."

In the wood pulping industry, trees are conventionally classified as either hardwood or softwood. In the practice of the present invention, pulp for use as starting material in the practice of the present invention can be derived from softwood tree species such as, but not limited to: fir (preferably Douglas fir and Balsam fir), pine (preferably Eastern white pine and Loblolly pine), spruce (preferably White spruce), larch (preferably Eastern larch), cedar, and hemlock (preferably Eastern and Western hemlock). Examples of hardwood species from which pulp useful as a starting material in the present invention can be derived include, but are not limited to: acacia, alder (preferably Red alder and European black alder) aspen (preferably Quaking aspen), beech, birch, oak (preferably White oak), gum trees (preferably eucalyptus and Sweetgum), poplar (preferably Balsam poplar, Eastern cottonwood, Black cottonwood and Yellow poplar), gmelina and maple (preferably Sugar maple, Red maple, Silver maple and Bigleaf maple).

Wood from softwood or hardwood species generally includes three major components: cellulose, hemicellulose and lignin. Cellulose makes up about 50% of the woody structure of plants and is an unbranched polymer of D-glucose monomers. Individual cellulose polymer chains associate to form thicker microfibrils which, in turn, associate to form fibrils which are arranged into bundles. The bundles form fibers which are visible as components of the plant cell wall when viewed at high magnification under a light microscope. Cellulose is highly crystalline as a result of extensive intramolecular and intermolecular hydrogen bonding.

The term hemicellulose refers to a heterogeneous group of low molecular weight carbohydrate polymers that are associated with cellulose in wood. Hemicelluloses are amorphous, branched polymers, in contrast to cellulose which is a linear polymer. The principal, simple sugars that combine to form hemicelluloses are: D-glucose, D-xylose, D-mannose, L-arabinose, D-galactose, D-glucuronic acid and D-galacturonic acid.

Lignin is a complex aromatic polymer and comprises about 20% to 40% of wood where it occurs as an amorphous polymer.

In the pulping industry, differences in the chemistry of the principal components of wood are exploited in order to purify cellulose. For example, heated water in the form of steam causes the removal of acetyl groups from hemicellulose with a corresponding decrease in pH due to the formation of acetic acid. Acid hydrolysis of the carbohydrate components of wood then ensues, with a lesser hydrolysis of lignin. Hemicelluloses are especially susceptible to acid hydrolysis, and most can be degraded by an initial steam, prehydrolysis step in the Kraft pulping process, as described in the Background, or in an acidic sulfite cooking process.

With respect to the reaction of wood with alkali solutions, all components of wood are susceptible to degradation by strong alkaline conditions. At the elevated temperature of 140° C. or greater that is typically utilized during Kraft wood pulping, the hemicelluloses and lignin are preferentially degraded by dilute alkaline solutions. Additionally, all components of wood can be oxidized by bleaching agents such as chlorine, sodium hypochlorite and hydrogen peroxide.

Conventional pulping procedures, such as sulfite pulping or alkaline pulping, can be used to provide a wood pulp that is treated in accordance with the present invention to provide a composition useful for making lyocell fibers. An example of a suitable alkaline pulping process is the Kraft process, without an acid prehydrolysis step. When utilized as a starting material in the practice of the present invention, Kraft pulps are not subject to acid prehydrolysis. By avoiding the acid pretreatment step prior to alkaline pulping, the overall cost of producing the pulped wood is reduced. Further, current industry practice utilizes batch pre-hydrolysis treatments whereas continuous pulping systems are increasingly being employed to produce pulp. Consequently, batch pre-hydrolysis treatments may limit the rate of pulp production in an otherwise continuous pulping system.

Characteristics of pulped wood suitable for use as a starting material in the practice of the present invention include a hemicellulose content of at least 7% by weight, preferably from 7% to about 30% by weight, more preferably from 7% to about 25% by weight, and most preferably from about 9% to about 20% by weight; an average D.P. of cellulose of from about 600 to about 1800; and a lignin content of from 0% to about 20% by weight. As used herein, the term "percent (or %) by weight" or "weight percent", or grammatical variants thereof, when applied to the hemicellulose or lignin content of pulp, means weight percentage relative to the dry weight of the pulp.

The pulp may be subjected to bleaching by any conventional bleaching process utilizing bleaching agents including, but not limited to, chlorine, chlorine dioxide, sodium hypochlorite, peracids and hydrogen peroxide.

As shown in FIG. 1, in the practice of the present invention, once starting material, such as softwood, has been converted to pulp, such as a Kraft pulp, containing cellulose and hemicellulose, it is subjected to treatment whereby the average D.P. of the cellulose is reduced, without substantially reducing the hemicellulose content, to provide the compositions of the present invention. In this context, the term "without substantially reducing the hemicellulose content" means without reducing the hemicellulose content by more than about 50%, preferably not more than about 15%, and most preferably not more than about 5%. The term "degree of polymerization" (abbreviated as D.P.) refers to the number of D-glucose monomers in a cellulose molecule. Thus, the term "average degree of polymerization", or "average D.P.", refers to the average number of D-glucose molecules per cellulose polymer in a population of cellulose polymers. This D.P. reduction treatment occurs after the pulping process and before, after or substantially simultaneously with the bleaching process, if a bleaching step is utilized. In this context, the term "substantially simultaneously with" means that at least a portion of the D.P. reduction step occurs at the same time as at least a portion of the bleaching step. Preferably the bleaching step, if utilized, occurs before treatment to reduce the average D.P. of the cellulose. Preferably the average D.P. of the cellulose is reduced to a value within the range of from about 200 to about 1100; more preferably to a value within the range of from about 300 to about 1100; most preferably to a value of from about 400 to about 700. Unless stated otherwise, D.P. is determined by ASTM Test 1301–12. A D.P. within the foregoing ranges is desirable because, in the range of economically attractive operating conditions, the viscosity of the dope, i.e., the solution of treated pulp from which lyocell fibers are produced, is sufficiently low that the dope can be readily extruded through the narrow orifices utilized to form lyocell fibers, yet not so low that the strength of the resulting lyocell fibers is substantially compromised. Preferably the range of D.P. values of the treated pulp will be unimodal and will have an approximately normal distribution that is centered around the modal D.P. value.

The hemicellulose content of the treated pulp, expressed as a weight percentage, is at least 7% by weight; preferably from about 7% by weight to about 30% by weight; more preferably from about 7% by weight to about 20% by weight; most preferably from about 10% by weight to about 17% by weight. As used herein, the term "percent (or %) by weight" or "weight percentage", or grammatical equivalents thereof, when applied to the hemicellulose or lignin content of treated pulp, means weight percentage relative to the dry weight of the treated pulp.

A presently preferred means of treating the pulp in order to reduce the average D.P. of the cellulose without substantially reducing the hemicellulose content is to treat the pulp with acid. Any acid can be utilized, including, but not limited to: hydrochloric, phosphoric, sulfuric, acetic and nitric acids, provided only that the pH of the acidified solution can be controlled. The presently preferred acid is sulfuric acid because it is a strong acid that does not cause a significant corrosion problem when utilized in an industrial scale process. Additionally, acid substitutes can be utilized instead of, or in conjunction with, acids. An acid substitute is a compound which forms an acid when dissolved in the solution containing the pulp. Examples of acid substitutes include sulfur dioxide gas, nitrogen dioxide gas, carbon dioxide gas and chlorine gas.

Where an acid, or acid substitute, or a combination of acids or acid substitutes, is utilized to treat the pulp, an amount of acid will be added to the pulp sufficient to adjust the pH of the pulp to a value within the range of from about 0.0 to about 5.0; preferably in the range of from about 0.0 to about 3.0; most preferably in the range of from about 0.5 to about 2.0. The acid treatment will be conducted for a period of from about 2 minutes to about 5 hours at a temperature of from about 20° C. to about 180° C.; preferably from about 50° C. to about 150° C.; most preferably from about 70° C. to about 110° C. The rate at which D.P. reduction occurs can be increased by increasing the temperature and/or pressure under which the acid treatment is conducted. Preferably the pulp is stirred during acid treatment, although stirring should not be vigorous. Additionally, acid treatment of pulp in accordance with the present invention results in a treated pulp having a low transition metal content as more fully described herein.

Another means of treating the pulp in order to reduce the average D.P. of the cellulose, without substantially reducing the hemicellulose content, is to treat the pulp with steam. The pulp is preferably exposed to direct or indirect steam at a temperature in the range of from about 120° C. to about 260° C. for a period of from about 0.5 minutes to about 10 minutes, at a pressure of from about 150 to about 750 psi. Preferably, the steam includes an amount of acid sufficient to reduce the pH of the steam to a value within the range of from about 1.0 to about 4.5. The acid can be any acid, but is preferably sulfuric acid. The exposure of the pulp to both acid and steam permits the use of lower pressure and temperature to reduce the average D.P. of the cellulose compared to the use of steam alone. Consequently, the use of steam together with acid produces fewer fiber fragments in the pulp.

Another means of treating the pulp in order to reduce the average D.P. of the cellulose, but without substantially reducing the hemicellulose content, is to treat the pulp with a combination of ferrous sulfate and hydrogen peroxide. The ferrous sulfate is present at a concentration of from about 0.1 M to about 0.6 M, the hydrogen peroxide is present at a concentration of from about 0.1% v/v to about 1.5% v/v, and the pulp is exposed to the combination for a period of from about 10 minutes to about one hour at a pH of from about 3.0 to about 5.0.

Yet another means of treating the pulp in order to reduce the average D.P. of the cellulose, but without substantially reducing the hemicellulose content, is to treat the pulp with a combination of at least one transition metal and peracetic acid. The transition metal(s) is present at a concentration of from about 5 ppm to about 50 ppm, the peracetic acid is present at a concentration of from about 5 mmol per liter to about 200 mmol per liter, and the pulp is exposed to the combination for a period of from about 0.2 hours to about 3 hours at a temperature of from about 40° C. to about 100° C.

Yet other means of treating the pulp in order to reduce the average D.P. of the cellulose, but without substantially reducing the hemicellulose content, is to treat the pulp with alkaline chlorine dioxide or with alkaline sodium hypochlorite.

With reference again to FIG. 1, once the pulp has been treated to reduce the average D.P. of the cellulose, preferably also to reduce the transition metal content, without substantially reducing the hemicellulose content of the pulp, the treated pulp is preferably further treated to lower the copper number to a value of less than about 2.0, more preferably less than about 1.1, most preferably less than about 0.7, as measured by Weyerhaeuser Test Number PPD3. A low copper number is desirable because it is generally believed that a high copper number causes cellulose degradation during and after dissolution. The copper number is an empirical test used to measure the reducing value of cellulose. The copper number is expressed in terms of the number of milligrams of metallic copper which is reduced from cupric hydroxide to cuprous oxide in alkaline medium by a specified weight of cellulosic material. The copper number of the treated pulp of the present invention can be reduced, for example, by treating the pulp with sodium borohydride or sodium hydroxide, as exemplified in Example 2 and Example 3, respectively, or by treating the pulp with one or more bleaching agents including, but not limited to, sodium hypochlorite, chlorine dioxide, peroxides (such as hydrogen peroxide) and peracids (such as peracetic acid), as exemplified in Example 17.

Again with reference to FIG. 1, once the copper number of the treated pulp has been reduced, the treated pulp can either be washed in water and transferred to a bath of organic solvent, such as NMMO, for dissolution prior to lyocell molded body formation, or the treated pulp can be washed with water and dried for subsequent packaging, storage and/or shipping. If the treated pulp is washed and dried, it is preferably formed into a sheet prior to drying. The dried sheet can then be formed into a roll or into a bale, if desired, for subsequent storage or shipping. In a particularly preferred embodiment, a sheet of a treated pulp of the present invention has a Mullen Burst Index of less than about 2.0 kN/g (kiloNewtons per gram), more preferably less than about 1.5 kN/g, most preferably less than about 1.2 kN/g. The Mullen Burst Index is determined using TAPPI Test Number T-220. Further, in a particularly preferred embodiment a sheet of a treated pulp of the present invention has a Tear Index of less than 14 mNm$^2$/g, more preferably less than 8 mNm$^2$/g, most preferably less than 4 mNm$^2$/g. The Tear Index is determined using TAPPI Test Number T-220. A sheet of dried, treated pulp having Mullen Burst Index and Tear Index values within the foregoing ranges is desirable because the sheets made from treated pulp can be more easily broken down into small fragments thereby facilitating dissolution of the treated pulp in a solvent such as NMMO. It is desirable to use as little force as possible to break down the treated pulp sheets because the application of a large amount of crushing or compressive force generates sufficient heat to cause hornification of the treated pulp, i.e., hardening of the treated pulp at the site of compression thereby generating relatively insoluble particles of treated pulp. Alternatively, the treated, washed pulp can be dried and broken into fragments for storage and/or shipping.

A desirable feature of the treated pulps of the present invention is that the cellulose fibers remain substantially intact after treatment. Consequently, the treated pulp has a freeness and a fines content that are similar to, or less than, those of the untreated pulp. The ability to form the treated pulp of the present invention into a sheet, which can then be formed into a roll or bale, is largely dependent on the integrity of the cellulose fiber structure. Thus, for example, the fibers of pulp that has been subjected to extensive steam explosion, i.e., treated with high pressure steam that causes the fibers to explode, in order to reduce the average D.P. of the cellulose, are extensively fragmented. Consequently, to the best of the present applicants' knowledge, steam exploded pulp cannot be formed into a sheet or roll in a commercially practicable way. Steam treatment of pulp according to the practice of the present invention is conducted under relatively mild conditions that do not result in significant damage to the pulp fibers.

Another desirable feature of the treated pulps of the present invention is their ready solubility in organic solvents, such as tertiary amine oxides including NMMO. Rapid solubilization of the treated pulp prior to spinning lyocell fibers is important in order to reduce the time required to generate lyocell fibers, or other molded bodies such as films, and hence reduce the cost of the process. Further, efficient dissolution is important because it minimizes the concentration of residual, undissolved particles, and partially dissolved, gelatinous material, which can reduce the speed at which fibers can be spun, tend to clog the spinnerets through which lyocell fibers are spun, and may cause breakage of the fibers as they are spun.

While not wishing to be bound by theory, it is believed that the processes of the present invention utilized to reduce the average D.P. of the cellulose also permeabilize the secondary layer of the pulp fibers, thereby permitting the efficient penetration of solvent throughout the pulp fiber. The secondary layer is the predominant layer of the cell wall and contains the most cellulose and hemicellulose.

The solubility of treated pulps of the present invention in a tertiary amine oxide solvent, such as NMMO, can be measured by counting the number of undissolved, gelatinous particles in a solution of the pulp. Example 7 herein shows the total number of undissolved, gelatinous particles in a sample of treated pulp of the present invention as measured by laser scattering.

Preferably, compositions of the present invention fully dissolve in NMMO in less than about 70 minutes, preferably less than about 20 minutes, utilizing the dissolution procedure described in Example 6 herein. The term "fully dissolve", when used in this context, means that substantially no undissolved particles are seen when a dope, formed by dissolving compositions of the present invention in NMMO, is viewed under a light microscope at a magnification of 40× to 70×.

Further, compositions of the present invention preferably have a carbonyl content of less than about 120 µmol/g and a carboxyl content of less than about 120 µmol/g. The carboxyl and carbonyl group content are measured by means of proprietary assays performed by Thuringisches Institut fur Textil-und Kunstoff Forschunge. V., Breitscheidstr. 97, D-07407 Rudolstadt, Germany.

Additionally, the treated pulp of the present invention preferably has a low transition metal content. Transition metals are undesirable in treated pulp because, for example, they accelerate the degradation of cellulose and NMMO in the lyocell process. Examples of transition metals commonly found in treated pulp derived from trees include iron, copper, nickel and manganese. Preferably, the total transition metal content of the compositions of the present invention is less than about 20 ppm, more preferably less than about 5 ppm. Preferably the iron content of the compositions of the present invention is less than about 4 ppm, more preferably less than about 2 ppm, as measured by Weyerhaeuser Test AM5-PULP-1/6010, and the copper content of the compositions of the present invention is preferably less than about 1.0 ppm, more preferably less than about 0.5 ppm, as measured by Weyerhaeuser Test AM5-PULP-1/6010.

In order to make lyocell fibers, or other molded bodies, such as films, from the treated pulp of the present invention, the treated pulp is first dissolved in an amine oxide, preferably a tertiary amine oxide. Representative examples of amine oxide solvents useful in the practice of the present invention are set forth in U.S. Pat. No. 5,409,532. The presently preferred amine oxide solvent is N-methyl-morpholine-N-oxide (NMMO). Other representative examples of solvents useful in the practice of the present invention include dimethylsulfoxide (D.M.S.O.), dimethylacetamide (D.M.A.C.), dimethylformamide (D.M.F.) and caprolactan derivatives. The treated pulp is dissolved in amine oxide solvent by any art-recognized means such as are set forth in U.S. Pat. Nos. 5,534,113; 5,330,567 and 4,246,221. The dissolved, treated pulp is called dope. The dope is used to manufacture lyocell fibers, or other molded bodies, such as films, by a variety of techniques. Examples of techniques for making a film from the compositions of the present invention are set forth in U.S. Pat. No. 5,401,447 to Matsui et al., and in U.S. Pat. Ser. No. 5,277,857 to Nicholson.

Figure 2:
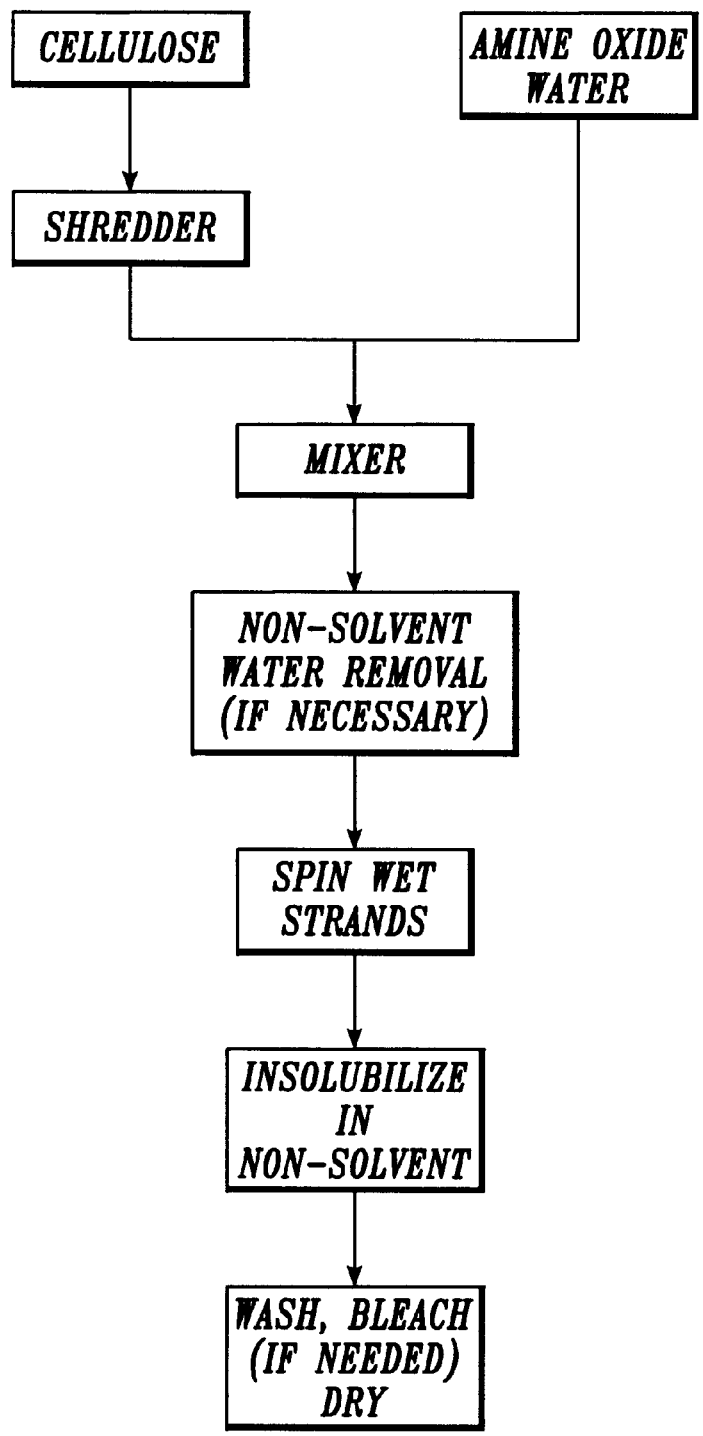
FIG. 2 is a block diagram of the steps of the presently preferred process of forming fibers from the compositions of the present invention.

One useful technique for making lyocell fibers from dope involves extruding the dope through a die to form a plurality of filaments, washing the filaments to remove the solvent, and drying the lyocell filaments. FIG. 2 shows a block diagram of the presently preferred process for forming lyocell fibers from the treated pulps of the present invention. The term "cellulose" in FIG. 2 refers to the compositions of the present invention. If necessary, the cellulose in the form of treated pulp is physically broken down, for example by a shredder, before being dissolved in an amine oxide-water mixture to form a dope. The treated pulp of the present invention can be dissolved in an amine solvent by any known manner, e.g., as taught in McCorsley U.S. Pat. No. 4,246,221. Here the treated pulp is wet in a nonsolvent mixture of about 40% NMMO and 60% water. The ratio of treated pulp to wet NMMO is about 1:5.1 by weight. The mixture is mixed in a double arm sigma blade mixer for about 1.3 hours under vacuum at about 120° C. until sufficient water has been distilled off to leave about 12–14% based on NMMO so that a cellulose solution is formed. Alternatively, NMMO of appropriate water content may be used initially to obviate the need for the vacuum distillation. This is a convenient way to prepare spinning dopes in the laboratory where commercially available NMMO of about 40–60% concentration can be mixed with laboratory reagent NMMO having only about 3% water to produce a cellulose solvent having 7–15% water. Moisture normally present in the pulp should be accounted for in adjusting necessary water present in the solvent. Reference might be made to articles by Chanzy, H. and A. Peguy, *Journal of Polymer Science, Polymer Physics Ed.* 18:1137–1144(1980) and Navard, P. and J. M. Haudin, *British Polymer Journal*, p. 174 (Dec. 1980) for laboratory preparation of cellulose dopes in NMMO water solvents.

The dissolved, treated pulp (now called the dope) is forced through extrusion orifices into a turbulent air stream rather than directly into a regeneration bath as is the case with viscose or cuprammonium rayon. Only later are the latent fibers regenerated.

Figure 3:
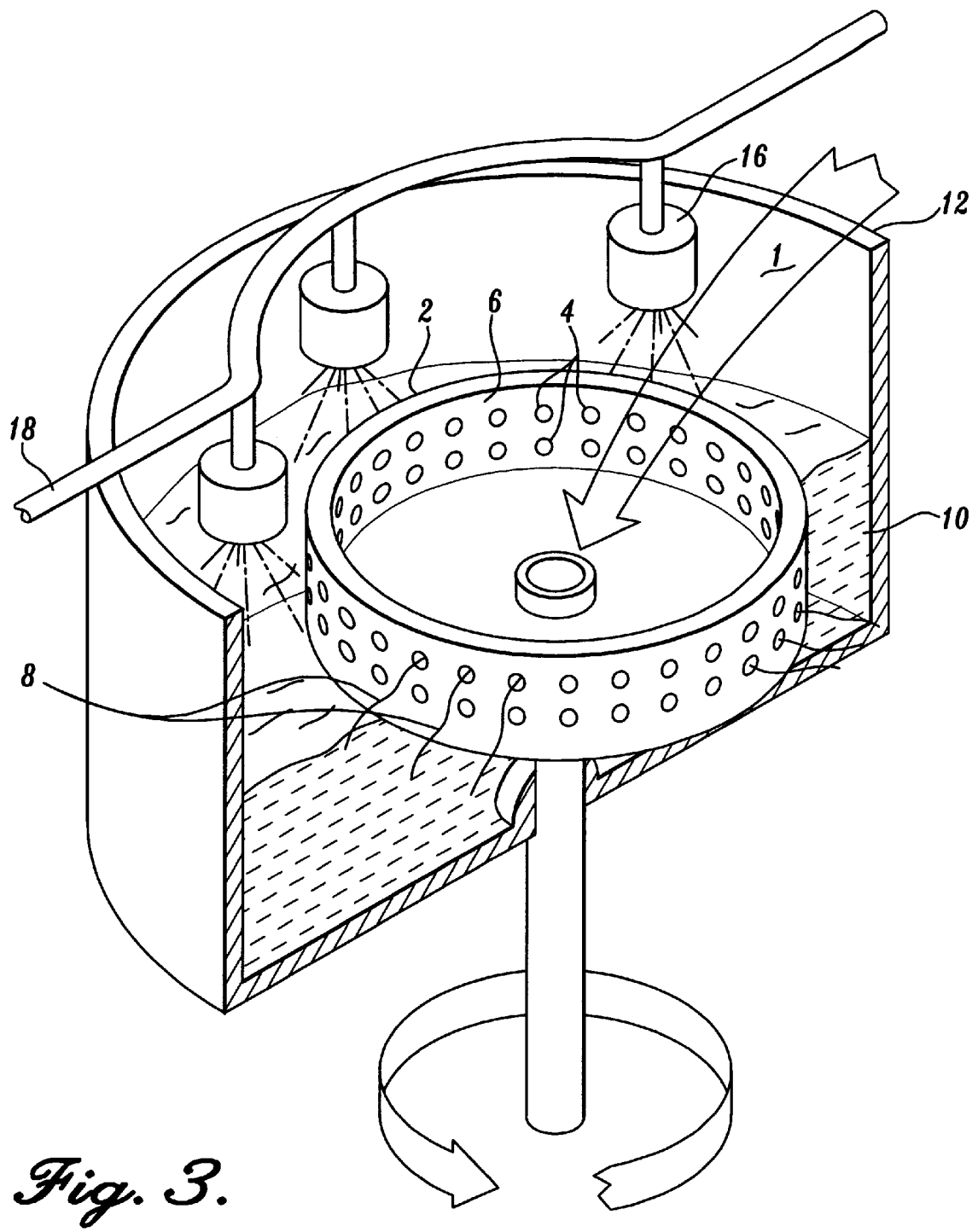
FIG. 3 is a partially cut away perspective representation of centrifugal spinning equipment useful with the present invention.

One example of such a technique is termed centrifugal spinning. Centrifugal spinning has been used to form fibers from molten synthetic polymers, such as polypropylene. Centrifugal spinning is exemplified in U.S. Pat. Nos. 5,242,633 and 5,326,241 to Rook et al., and in U.S. Pat. No. 4,440,700 to Okada et al. A presently preferred apparatus and method for forming lyocell fibers of the present invention by centrifugal spinning is set forth in U.S. patent application Ser. No. 09/039,737, incorporated herein by reference. FIG. 3 is illustrative of a presently preferred centrifugal spinning equipment used to make lyocell fibers of the present invention. With reference to FIG. 3, in a typical centrifugal spinning process the heated dope 1 is directed into a heated generally hollow cylinder or drum 2 with a closed base and a multiplicity of small apertures 4 in the sidewalls 6. As the cylinder rotates, dope is forced out horizontally through the apertures as thin strands 8. As these strands meet resistance from the surrounding air they are drawn or stretched by a large factor. The amount of stretch will depend on readily controllable factors such as cylinder rotational speed, orifice size, and dope viscosity. The dope strands either fall by gravity or are gently forced downward by an air flow into a non-solvent 10 held in a basin 12 where they are coagulated into individual oriented fibers. Alternatively, the dope strands 8 can be either partially or completely regenerated by a water spray from a ring of spray nozzles 16 fed by a source of regenerating solution 18. Also, they can be formed into a nonwoven fabric prior to or during regeneration. Water is the preferred coagulating non-solvent although ethanol or water-ethanol mixtures are also useful. From this point the fibers are collected and may be washed to remove any residual NMMO, bleached if desired, and dried. The presently preferred centrifugal spinning process also differs from conventional processes for forming lyocell fibers since the dope is not continuously drawn linearly downward as unbroken threads through an air gap and into the regenerating bath.

Another example of a technique useful for forming the lyocell fibers of the present invention is referred to as melt blowing wherein dope is extruded through a series of small diameter orifices into a high velocity air stream flowing generally parallel to the extruded fibers. The high velocity air draws or stretches the fibers as they cool. The stretching serves two purposes: it causes some degree of longitudinal molecular orientation and reduces the ultimate fiber diameter. Melt blowing has been extensively used since the 1970s to form fibers from molten synthetic polymers, such as polypropylene. Exemplary patents relating to melt blowing are Weber et al., U.S. Pat. No. 3,959,421, Milligan et al., U.S. Pat. No. 5,075,068, and U.S. Pat. Nos. 5,628,941; 5,601,771; 5,601,767; 4,416,698; 4,246,221 and 4,196,282.

Melt-blowing typically produces fibers having a small diameter (most usually less than 10 μm) which are useful for producing non-woven materials.

In the presently preferred melt-blowing method, the dope is transferred at somewhat elevated temperature to the spinning apparatus by a pump or extruder at temperatures from 70° C. to 140° C. Ultimately the dope is directed to an extrusion head having a multiplicity of spinning orifices. The dope filaments emerge into a relatively high velocity turbulent gas stream flowing in a generally parallel direction to the path of the latent fibers. As the dope is extruded through the orifices the liquid strands or latent filaments are drawn (or significantly decreased in diameter and increased in length) during their continued trajectory after leaving the orifices. The turbulence induces a natural crimp and some variability in ultimate fiber diameter both between fibers and along the length of individual fibers. The crimp is irregular and will have a peak to peak amplitude that is usually greater than about one fiber diameter with a period usually greater than about five fiber diameters. At some point in their trajectory the fibers are contacted with a regenerating solution. Regenerating solutions are nonsolvents such as water, lower aliphatic alcohols, or mixtures of these. The NMMO used as the solvent can then be recovered from the regenerating bath for reuse. Preferably the regenerating solution is applied as a fine spray at some predetermined distance below the extrusion head.

Figure 4:
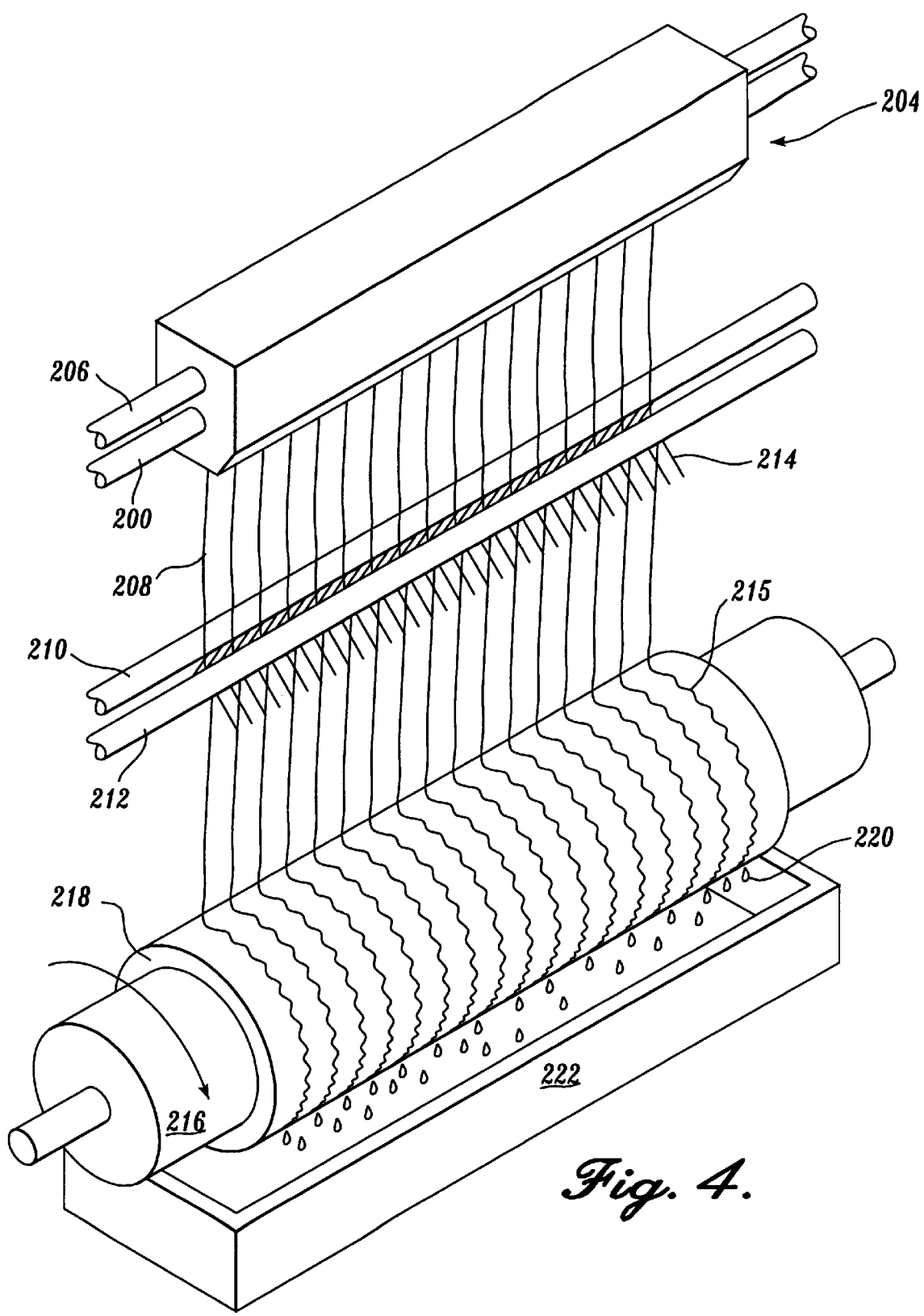
FIG. 4 is a partially cut away perspective representation of melt blowing equipment useful with the present invention.

A presently preferred method and apparatus for forming lyocell fibers by melt blowing is set forth in U.S. patent application Ser. No. 09/039,737, incorporated herein by reference. The overall preferred meltblowing process is represented by the block diagram presented in FIG. 2. FIG. 4 shows details of the presently preferred melt blowing process. A supply of dope is directed through an extruder and positive displacement pump, not shown, through line 200 to an extrusion head 204 having a multiplicity of orifices. Compressed air or another gas is supplied through line 206. Latent fibers 208 are extruded from orifices 340 (seen in FIG. 5). These thin strands of dope 208 are picked up by the high velocity gas stream exiting from slots 344 (FIG. 5) in the extrusion head and are significantly stretched or elongated as they are carried downward. At an appropriate point in their travel the now stretched latent fiber strands 208 pass between two spray pipes 210, 212 and are contacted with a water spray or other regenerating liquid 214. The regenerated strands 215 are picked up by a rotating pickup roll 216 where they continuously accumulate at 218 until a sufficient amount of fiber has accumulated. At that time, a new roll 216 is brought in to capture the fibers without slowing production, much as a new reel is used on a paper machine.

The surface speed of roll 216 is preferably slower than the linear speed of the desending fibers 215 so that they in essence festoon somewhat as they accumulate on the roll. It is not desirable that roll 216 should put any significant tension on the fibers as they are accumulated. Alternatively, a moving foraminiferous belt may be used in place of the roll to collect the fibers and direct them to any necessary downstream processing. The regeneration solution containing diluted NMMO or other solvent drips off the accumulated fiber 220 into container 222. From there it is sent to a solvent recovery unit where recovered NMMO can be concentrated and recycled back into the process.

Figure 5:
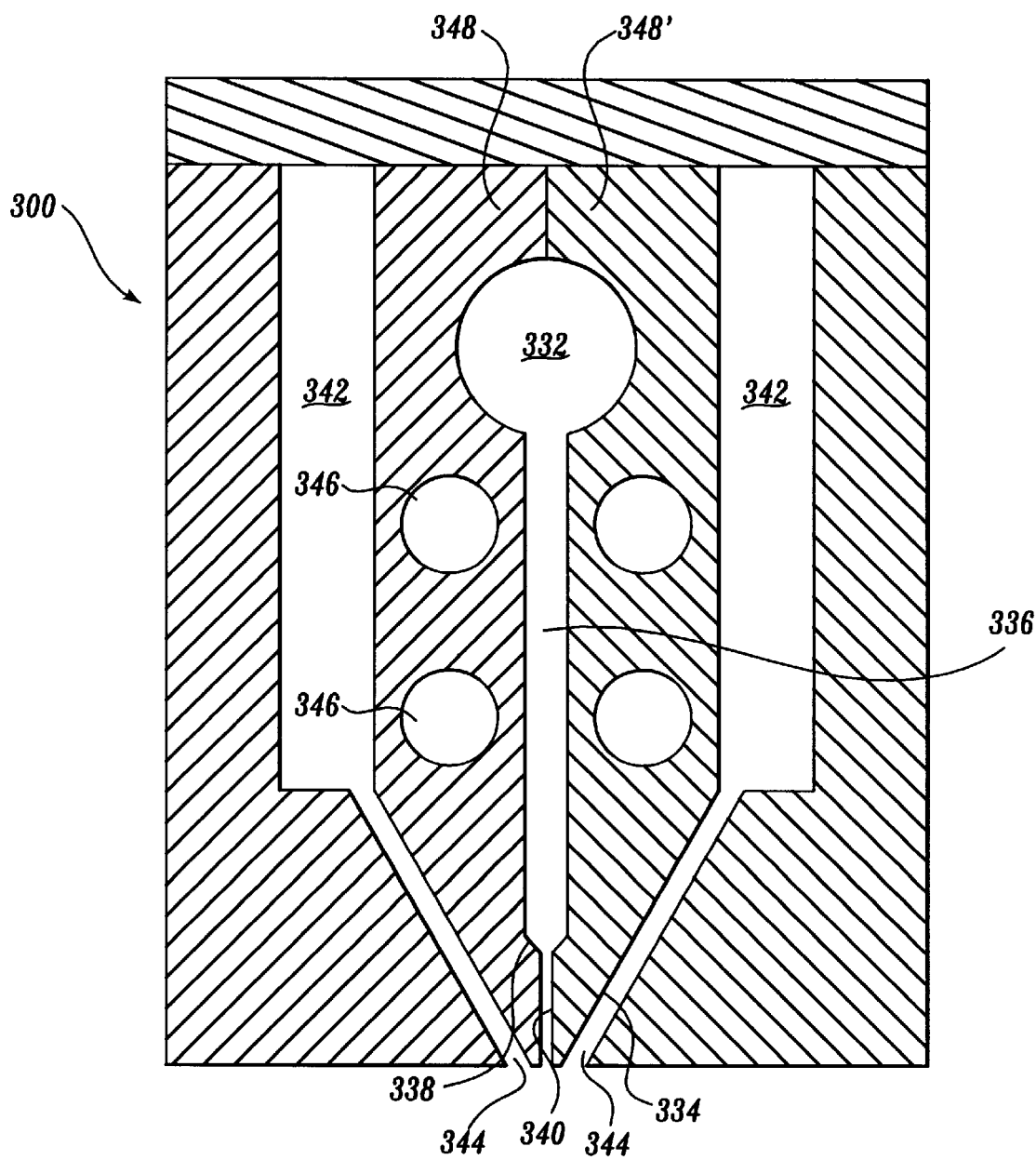
FIG. 5 is a cross sectional view of an extrusion head that is preferably used with the melt blowing apparatus of FIG. 4.

FIG. 5 shows a cross section of a presently preferred extrusion head 300 useful in the presently preferred melt-blowing process. A manifold or dope supply conduit 332 extends longitudinally through the nosepiece 340. Within the nosepiece a capillary or multiplicity of capillaries 336 descend from the manifold. These decrease in diameter smoothly in a transition zone 338 into the extrusion orifices 340. Gas chambers 342 also extend longitudinally through the die. These exhaust through slits 344 located adjacent the outlet end of the orifices. Internal conduits 346 supply access for electrical heating elements or steam/oil heat. The gas supply in chambers 342 is normally supplied preheated but provisions may also be made for controlling its temperature within the extrusion head itself.

The capillaries and nozzles in the extrusion head nosepiece can be formed in a unitary block of metal by any appropriate means such as drilling or electrodischarge machining. Alternatively, due to the relatively large diameter of the orifices, the nosepiece may be machined as a split die with matched halves 348, 348" (FIG. 5). This presents a significant advantage in machining cost and in ease of cleaning.

Spinning orifice diameter may be in the 300–600 μm range, preferably about 400–500 μm. with a L/D ratio in the range of about 2.5–10. Most desirably a lead in capillary of greater diameter than the orifice is used. The capillary will normally be about 1.2–2.5 times the diameter of the orifice and will have a LID ratio of about 10–250. Commercial lyocell fibers are spun with very small orifices in the range of 60–80 μm. The larger orifice diameters utilized in the presently preferred melt-blowing apparatus and method are advantageous in that they are one factor allowing much greater throughput per unit of time, e.g., throughputs that equal or exceed about 1 g/min/orifice. Further, they are not nearly as susceptible to plugging from small bits of foreign matter or undissolved material in the dope as are the smaller nozzles. The larger nozzles are much more easily cleaned if plugging should occur and construction of the extrusion heads is considerably simplified. Operating temperature and temperature profile along the orifice and capillary should preferably fall within the range of about 70° C. to about 140° C. It appears beneficial to have a rising temperature near the exit of the spinning orifices. There are many advantages to operation at as high a temperature as possible, up to about 140° C. where NMMO begins to decompose. Among these advantages, throughput rate may generally be increased at higher dope temperatures. By profiling orifice temperature, the decomposition temperature may be safely approached at the exit point since the time the dope is held at or near this temperature is very minimal. Air temperature as it exits the melt blowing head can be in the 40°–100° C. range, preferably about 70° C.

The extruded latent fiber filaments carried by the gas stream are preferably regenerated by a fine water spray during the later part of their trajectory. They are received on a take-up roll or moving foraminous belt where they may be transported for further processing. The take-up roll or belt will normally be operated at a speed somewhat lower than that of the arriving fibers so that there is no or only minimal tension placed on the arriving fibers.

Fibers produced by the presently preferred melt blowing process and apparatus of the present invention possess a natural crimp quite unlike that imparted by a stuffer box. Crimp imparted by a stuffer box is relatively regular, has a relatively low amplitude, usually less than one fiber diameter, and short peak-to-peak period normally not more than two or three fiber diameters. In one embodiment, preferred fibers of the present invention have an irregular amplitude usually greater than one fiber diameter and an irregular period usually exceeding about five fiber diameters, a characteristic of fibers having a curly or wavy appearance.

Figure 6:
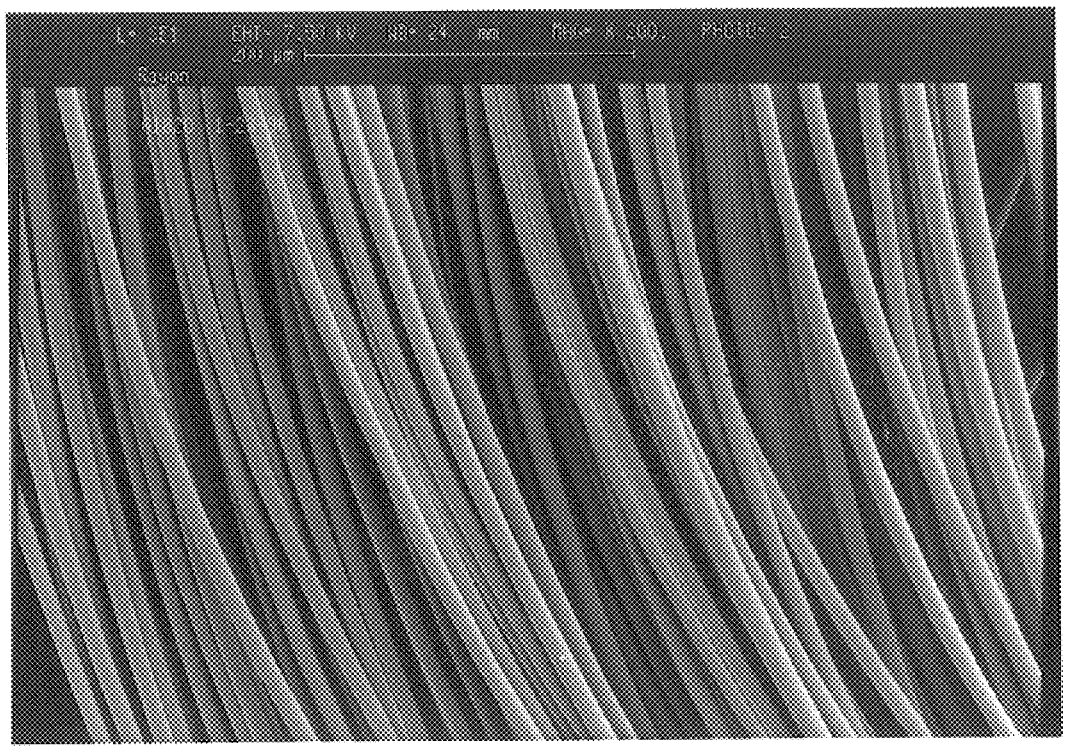
FIGS. 6 and 7 are scanning electron micrographs of commercially available TENCEL® lyocell fiber at 200× and 10,000× magnification respectively.
Figure 7:
Figure 8:
FIGS. 8 and 9 are scanning electron micrographs at 100× and 10,000× magnification of a melt blown lyocell fiber produced from a dope prepared, as set forth in Example 10, from treated pulp of the present invention.
Figure 9:

FIGS. 6 and 7 are scanning electron micrographs at 200× and 10,000× magnification, respectively, of commercially available TENCEL® lyocell fiber. These fibers are of quite uniform diameter and are essentially straight. The surface seen at 10,000× magnification in FIG. 7 is remarkably smooth. FIG. 8 and FIG. 9 are scanning electron micrographs of a melt blown lyocell fiber of the present invention at 100× and 10,000× magnification respectively. The fibers shown in FIG. 8 and FIG. 9 were produced from treated pulp as described in Example 10. As seen especially in FIG. 8, fiber diameter is variable and natural crimp of the fibers is significant. The overall morphology of the melt-blown fibers of the present invention is highly advantageous for forming fine, tight yarns since many of the features resemble those of natural fibers. As shown in FIG. 9, the surface of the melt-blown fibers is not smooth and is pebbled.

The presently preferred melt-blowing method is capable of production rates of at least about 1 g/min of dope per spinning orifice. This is considerably greater than the throughput rate of present commercial processes. Further, the fibers have a tensile strength averaging at least 2 g/denier and can readily be produced within the range of 4–100 µm in diameter, preferably about 5–30 µm. A most preferred fiber diameter is about 9–20 µm, approximately the range of natural cotton fibers. These fibers are especially well suited as textile fibers but could also find applications in filtration media, absorbent products, and nonwoven fabrics as examples.

Certain defects are known to be associated with melt blowing. "Shot" is a glob of polymer of significantly larger diameter than the fibers. It principally occurs when a fiber is broken and the end snaps back. Shot is often formed when process rates are high and melt and air temperatures and airflow rates are low. "Fly" is a term used to describe short fibers formed on breakage from the polymer stream. "Rope" is used to describe multiple fibers twisted and usually bonded together. Fly and rope occur at high airflow rates and high die and air temperatures. "Die swell" occurs at the exit of the spinning orifices when the emerging polymer stream enlarges to a significantly greater diameter than the orifice diameter. This occurs because polymers, particularly molecularly oriented polymers, do not always act as true liquids. When molten polymer streams are held under pressure, expansion occurs upon release of the pressure. Orifice design is critical for controlling die swell.

Figure 10:
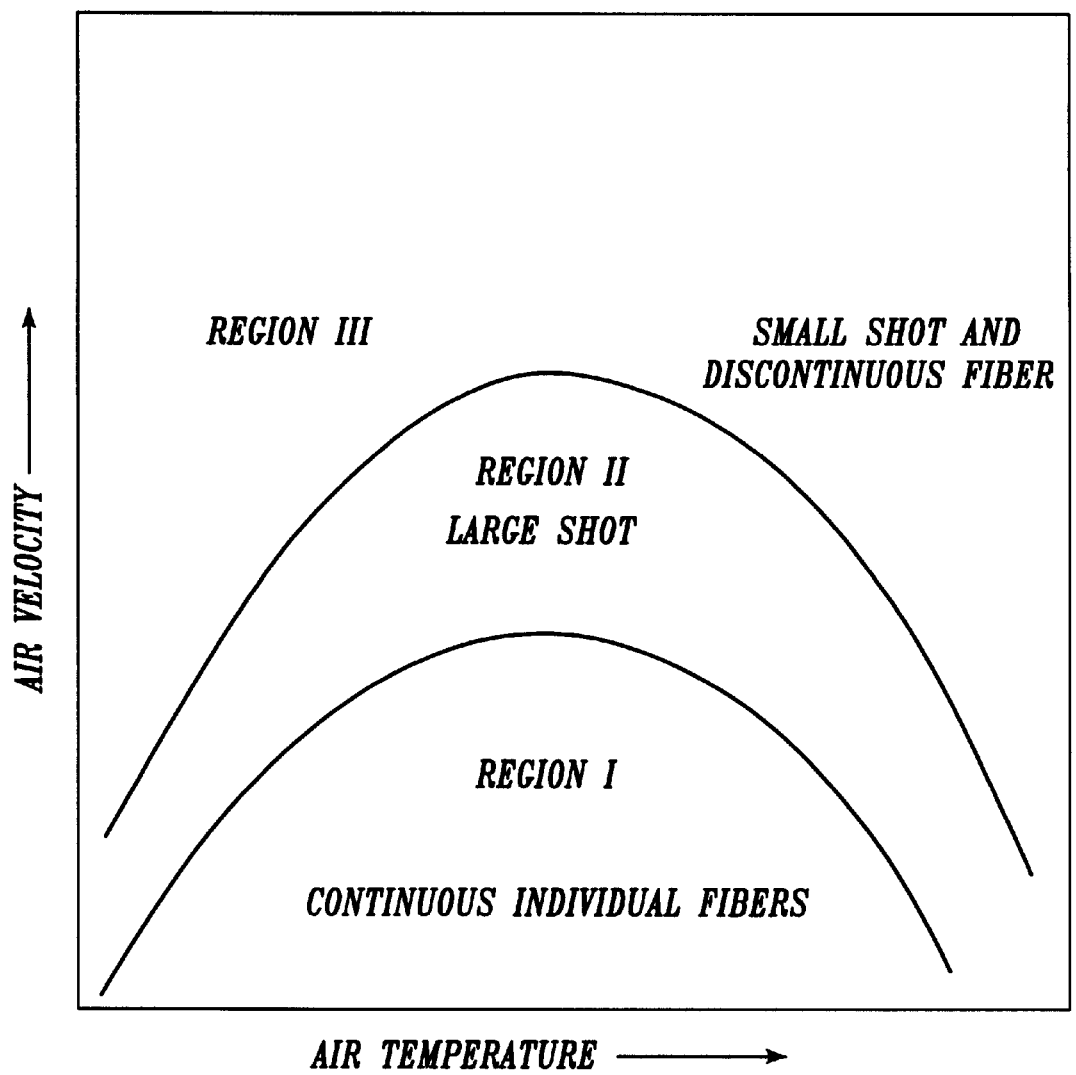
FIG. 10 is a graph showing melt blowing conditions where continuous shot free fibers can be produced.

Melt blowing of thermoplastics has been described by R. L. Shambaugh, *Industrial and Engineering Chemistry Research* 27:2363–2372 (1988) as operating in three regions. Region I has relatively low gas velocity similar to commercial "melt spinning" operations where fibers are continuous. Region II is an unstable region which occurs as gas velocity is increased. The filaments break up into fiber segments. Region III occurs at very high air velocities with excessive fiber breakage. In the presently preferred melt blowing process, air velocity, air mass flow and temperature, and dope mass flow and temperature are chosen to give operation in Region I as above described where a shot free product of individual continuous fibers in a wide range of deniers can be formed. FIG. 10 is a graph showing in general terms the region I operating region to which the present preferred melt-blowing process is limited. Region I is the area in which fibers are substantially continuous without significant shot, fly or roping. Operation in this region is important for production of fibers of greatest interest to textile manufacturers. The exact operating condition parameters such as flow rates and temperatures will depend on the particular dope characteristics and specific melt blowing head construction and can be readily determined experimentally.

A technique known as spun bonding can also be used to make lyocell fibers of the present invention. In spun bonding, the lyocell fiber is extruded into a tube and stretched by an airflow through the tube caused by a vacuum at the distal end. In general, spun bonded fibers are continuous, while commercial melt blown fibers tend to be formed in discrete, shorter lengths. Spun bonding has been used since the 1970s to form fibers from molten synthetic polymers, such as polypropylene, and the numerous, art-recognized techniques for spun bonding synthetic fibers can be readily modified by one of ordinary skill in the art for use in forming lyocell fibers from a dope formed from pulp treated in accordance with the present invention. An exemplary patent relating to spun bonding is U.S. patent Ser. No. 5,545,371 to Lu.

Another technique useful for forming lyocell fibers is dry jet/wet. In this process, the lyocell filament exiting the spinneret orifices passes through an air gap before being submerged and coagulated in a bath of liquid. An exemplary patent relating to dry jet/wet spinning is U.S. patent Ser. No. 4,416,698 to McCorsley III.

Owing to the compositions from which they are produced, lyocell fibers produced in accordance with the present invention have a hemicellulose content that is equal to or less than the hemicellulose content of the treated pulp that was used to make the lyocell fibers. Typically the lyocell fibers produced in accordance with the present invention have a hemicellulose content that is from about 0% to about 30.0% less than the hemicellulose content of the treated pulp that was used to make the lyocell fibers. Lyocell fibers produced in accordance with the present invention have an average D.P. that is equal to, larger than or less than the average D.P. of the treated pulp that was used to make the lyocell fibers. Depending on the method that is used to form lyocell fibers, the average D.P. of the pulp may be further reduced during fiber formation, for example through the action of heat. Preferably the lyocell fibers produced in accordance with the present invention have an average D.P. that is equal to, or from about 0% to about 20% less than or greater than, the average D.P. of the treated pulp that was used to make the lyocell fibers.

The lyocell fibers of the present invention exhibit numerous desirable properties. For example, the lyocell fibers of the present invention exhibit a high affinity for dye stuffs. While not wishing to be bound by theory, it is believed that the enhanced affinity for dyestuffs exhibited by the fibers of the present invention results, at least in part, from the high hemicellulose content of the fibers.

Additionally, the lyocell fibers of the present invention have a substantially reduced tendency to fibrillate. As described more fully in the Background of the Invention, the term fibrillation refers to the process whereby small fibrils peel away from the surface of lyocell fibers, especially under conditions of wet abrasion such as occur during laundering.

Fibrillation is often responsible for the frosted appearance of dyed lyocell fabrics. Further, fibrillation also tends to cause "pilling" whereby the fibrils that peel away from the surface of the lyocell fibers become entangled into relatively small balls. Fibrillation thus imparts a prematurely aged appearance to fabrics made from lyocell fibers. While treatments that reduce the tendency of lyocell fibers to fibrillate are available, they add to the cost of manufacturing the fibers.

While there is no standard industry test to determine fibrillation resistance, the following procedure is typical of those used. 0.003 g to 0.065 g of individualized fibers are weighed and placed with 10 mL of water in a capped 25 mL test tube (13× 110 mm). Samples are placed on a shaker operating at low amplitude at a frequency of about 200 cycles per minute. The time duration of the test may vary from 4–80 hours. The samples shown in FIGS. 11–14 were shaken 4 hours.

Figure 11:
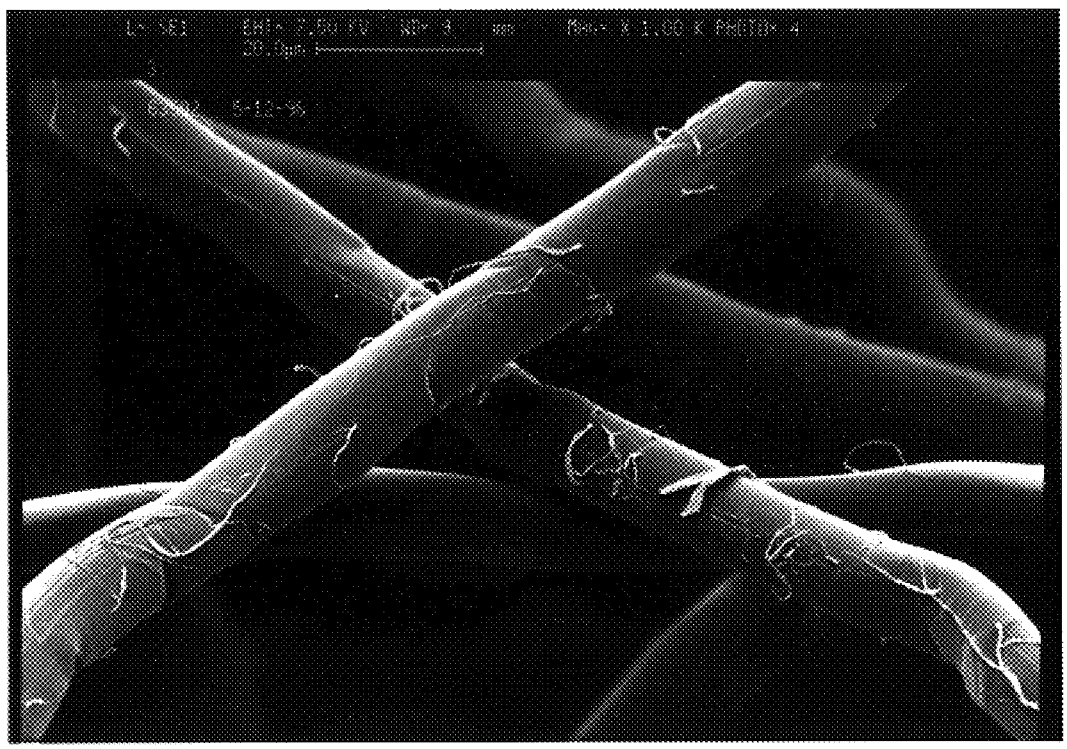
FIG. 11 is a scanning electron micrograph at 1000× of commercially available Lenzing lyocell fibers showing fibrillation caused by a wet abrasion test.
Figure 12:
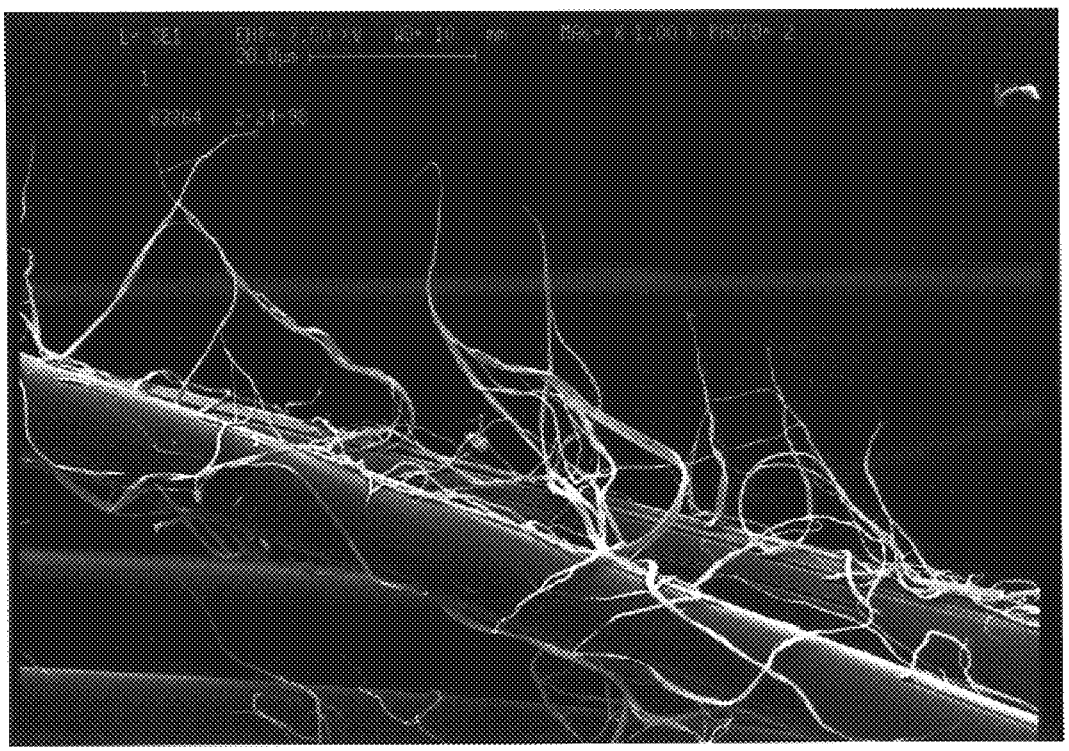
FIG. 12 is a scanning electron micrograph at 1000× of commercially available Tencel® lyocell fibers showing fibrillation caused by a wet abrasion test.
Figure 13:
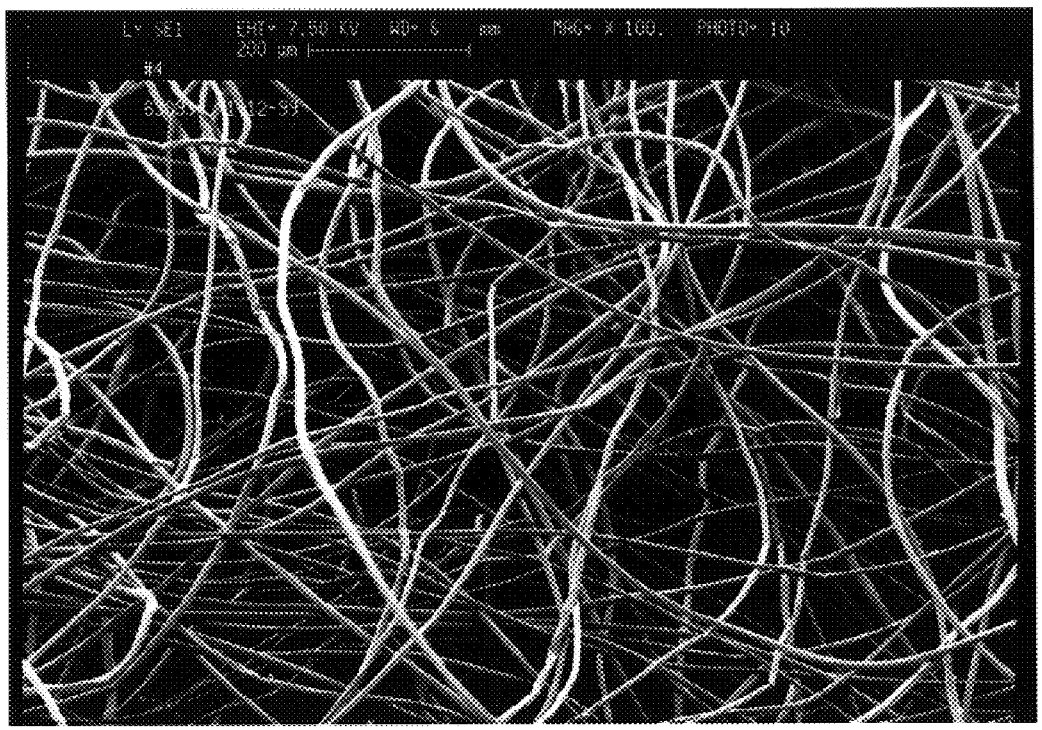
FIGS. 13 and 14 are scanning electron micrographs at 100× and 1000×, respectively, of a lyocell fiber sample produced from compositions of the present invention as set forth in Example 10 and submitted to the wet abrasion test.
Figure 14:
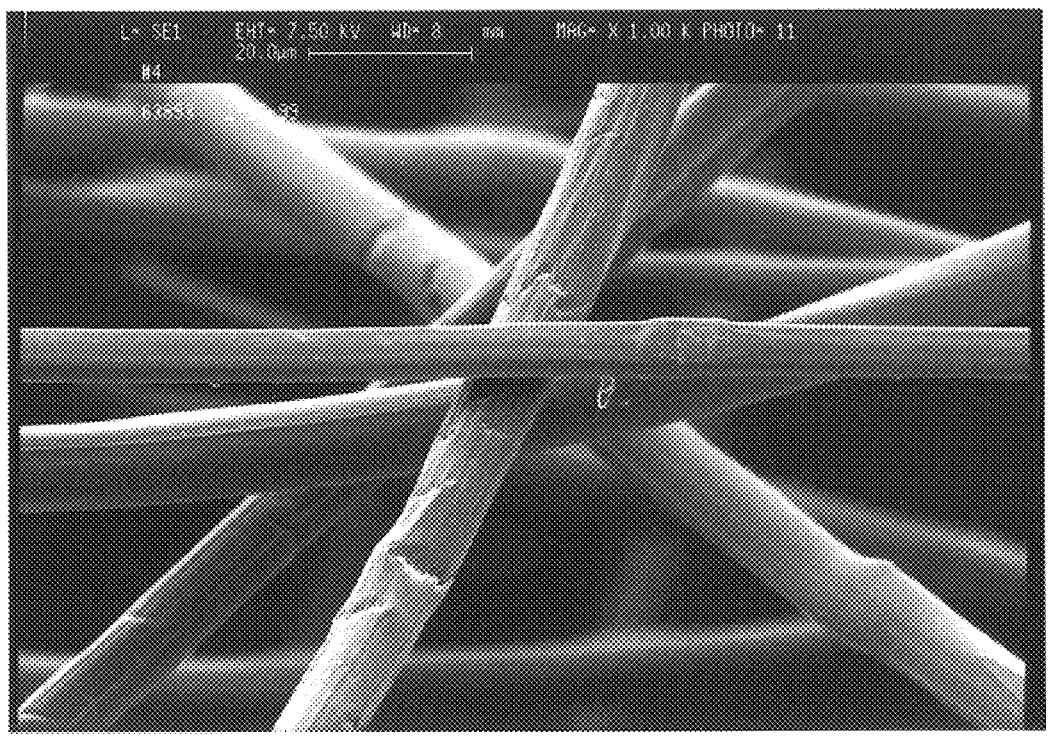

FIGS. 11 and 12 are scanning electron micrographs at 1000× of fibers from each of two commercial sources showing considerable fibrillation when tested by the foregoing test for fibrillation resistance. FIG. 11 shows a Lenzing lyocell fiber subjected to the wet abrasion test, and FIG. 12 shows a Tencel® lyocell fiber subjected to the wet abrasion test. Considerable fibrillation is evident. In comparison, FIGS. 13 and 14 are scanning electron micrographs at 100× and 1000×, respectively, of a melt-blown fiber sample produced from treated pulp as set forth in Example 10 and similarly submitted to the wet abrasion test. Fibrillation is very minor. While not wishing to be bound by theory, it is believed that the fibers of the present invention have somewhat lower crystallinity and orientation than those produced by existing commercial processes. The tendency to acquire a "frosted" appearance after use is almost entirely absent from the fibers of the present invention.

Lyocell fibers of the present invention formed from dopes prepared from treated pulp of the present invention exhibit physical properties making them suitable for use in a number of woven and non-woven applications. Examples of woven applications include textiles, fabrics and the like. Non-woven applications include filtration media and absorbent products by way of example. Examples of the properties possessed by lyocell fibers produced by a dry jet wet process from treated pulp of the present invention, include: denier of 0.3 to 10.0; tensile strength ranging from about 10 to about 38 cN/tex dry and about 5 cN/tex wet; elongation of about 10 to about 25% when dry and about 10 to about 35% when wet; and initial modulus less than about 1500 cN/tex when dry and about 250 to about 40 cN/tex when wet.

The fibers were produced by means of a proprietary dry jet wet spinning process performed by Thuringisches Institut fur Textil-und Kunstoff Forschunge. V., Breitscheidstr. 97, D-07407 Rudolstadt, Germany.

Figure 15:
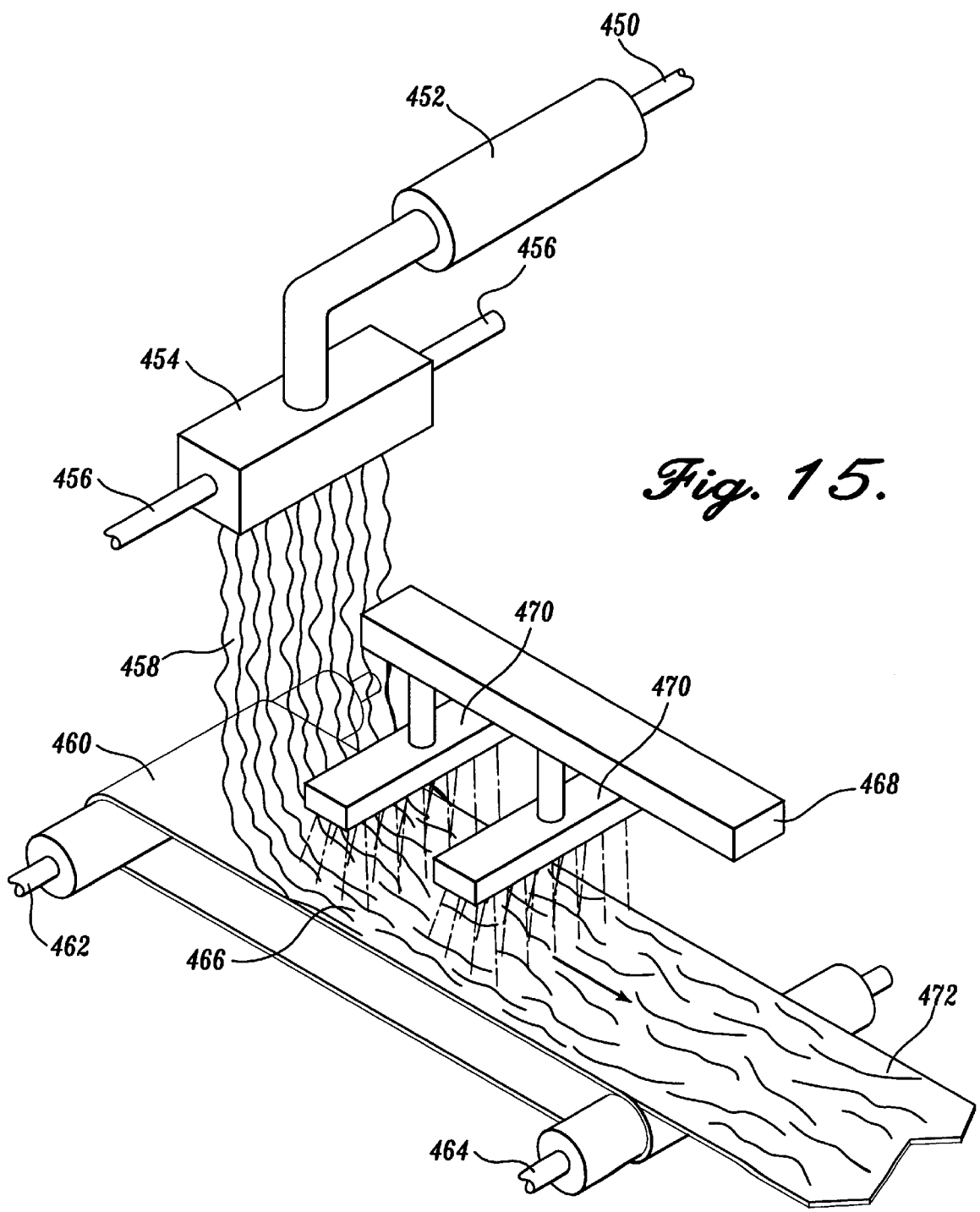
FIG. 15 is a drawing illustrating production of a self bonded nonwoven lyocell fabric using a melt blowing process (the equipment and process illustrated in FIG. 15 can also be utilized to make individual fibers)

FIG. 15 shows one method for making a self bonded lyocell nonwoven material using a modified melt blowing process. A cellulose dope 450 is fed to extruder 452 and from there to the extrusion head 454. An air supply 456 acts at the extrusion orifices to draw the dope strands 458 as they descend from the extrusion head. Process parameters are preferably chosen so that the resulting fibers will be continuous rather than random shorter lengths. The fibers fall onto an endless moving foraminous belt 460 supported and driven by rollers 462, 464. Here they form a latent nonwoven fabric mat 466. A top roller, not shown, may be used to press the fibers into tight contact and ensure bonding at the crossover points. As mat 466 proceeds along its path while still supported on belt 460, a spray of regenerating solution 468 is directed downward by sprayers 470 (although a sprayer positioned close to dope strands 458 is also effective). The regenerated product 472 is then removed from the end of the belt where it may be further processed, e.g., by further washing, bleaching and drying.

Figure 16:
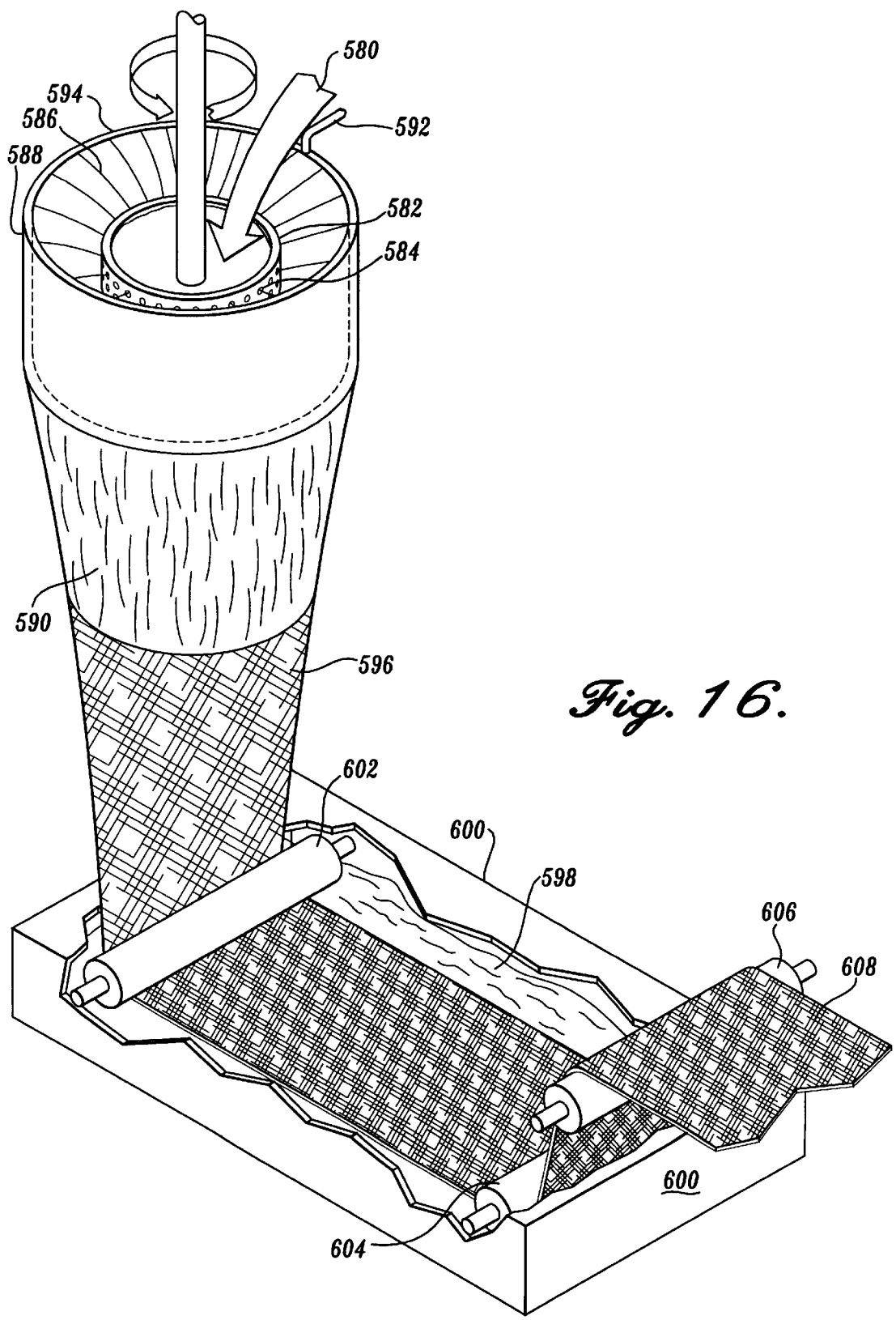
FIG. 16 is a drawing illustrating production of a self bonded nonwoven lyocell fabric using a centrifugal spinning process (the equipment and process illustrated in FIG. 16 can also be utilized to make individual fibers)

FIG. 16 is an alternative process for forming a self bonded nonwoven web using centrifugal spinning. A cellulose dope 580 is fed into a rapidly rotating drum 582 having a multiplicity of orifices 584 in the sidewalls. Latent fibers 586 are expelled through orifices 584 and drawn, or lengthened, by air resistance and the inertia imparted by the rotating drum. They impinge on the inner sidewalls of a receiver surface 588 concentrically located around the drum. The receiver may optionally have a frustoconical lower portion 590. A curtain or spray of regenerating solution 592 flows downward from ring 594 around the walls of receiver 588 to partially coagulate the cellulose mat impinged on the sidewalls of the receiver. Ring 594 may be located as shown or moved to a lower position if more time is needed for the latent fibers to self bond into a nonwoven web. The partially coagulated nonwoven web 596 is continuously mechanically pulled from the lower part 590 of the receiver into a coagulating bath 598 in container 600. As the web moves along its path it is collapsed from a cylindrical configuration into a planar two ply nonwoven structure. The web is held within the bath as it moves under rollers 602, 604. A takeout roller 606 removes the now fully coagulated two ply web 608 from the bath. Any or all of rollers 600, 602 or 604 may be driven. The web 608 is then continuously directed into a wash and/or bleaching operation, not shown, following which it is dried for storage. It may be split and opened into a single ply nonwoven or maintained as a two ply material as desired.

Additionally, the treated pulp of the present invention can be formed into films by means of techniques known to one of ordinary skill in the art. An example of a technique for making a film from the compositions of the present invention is set forth in U.S. Pat. No. 5,401,447 to Matsui et al., and in U.S. patent Ser. No. 5,277,857 to Nicholson.

The following examples merely illustrate the best mode now contemplated for practicing the invention, but should not be construed to limit the invention.

EXAMPLE 1

Acid hydrolysis

The average D.P. of the cellulose of Kraft pulp NB416 (a paper grade pulp with DP of about 1400) was reduced, without substantially reducing the hemicellulose content, by acid hydrolysis in the following manner. Two hundred grams of never-dried NB416 pulp was mixed with 1860 g of a 0.51% solution of sulfuric acid. The NB416 pulp had a cellulose content of 32% by weight, i.e., cellulose constituted 32% of the weight of the wet pulp, an average cellulose D.P. of about 1400 and a hemicellulose content of 13.6%±0.7%. The sulfuric acid solution was at a temperature of 100° C. prior to mixing with the NB416 pulp. The pulp and acid were mixed for 1 hour in a plastic beaker which was placed in a water bath that maintained the temperature of the pulp and acid mixture within the range of 83° C. to 110° C. After 1 hour, the acid and pulp mixture was removed from the water bath, poured onto a filter screen and washed with distilled water until the pH of the treated pulp was in the range of pH 5 to pH 7. The average D.P. of the cellulose of the acid-treated pulp was 665, the hemicellulose content was 14.5±0.7% and the copper number was 1.9.

EXAMPLE 2

Reduction of Copper Number By Treatment With Sodium Borohydride

The average D.P. of a sample of never-dried NB416 Kraft pulp was reduced by acid hydrolysis and the copper number of the acid-treated pulp was subsequently reduced by treatment with sodium borohydride in the following manner. Four hundred and twenty two grams of never-dried NB 416 pulp were placed in a plastic beaker containing 3600 grams of a 2.5% solution of sulfuric acid that was preheated to a temperature of 91° C. The pulp had a cellulose content of 32% by weight, the average D.P. of the pulp cellulose was 1400 and the hemicellulose content of the pulp was 13.6%±0.7%. The copper number of the NB 416 was about 0.5. The mixture of acid and pulp was placed in an oven and incubated at a temperature of 98° C. for two hours. After two hours the mixture of acid and pulp was removed from the oven and placed at room temperature to cool to a temperature of 61° C. and was then washed with distilled water until the pH of the treated pulp was in the range of pH 5 to pH 7. The average D.P. of the cellulose of the acid-treated pulp was 590, and the hemicellulose content of the acid-treated pulp was 14.1%±0.7%. The copper number of the acid-treated pulp was 2.4.

The acid-treated pulp was dried after washing with distilled water and the dried pulp was treated with sodium borohydride in order to reduce the copper number. One hundred grams of the dry, acid-treated pulp was added to distilled water containing one gram of dissolved sodium borohydride. The total volume of the pulp mixed with the sodium borohydride solution was three liters. The pulp was stirred in the sodium borohydride solution for three hours at room temperature (18° C. to 24° C.). The pulp was then washed with distilled water until the pH of the pulp was in the range of pH 5.0 to pH 7.0, and the pulp was then dried. The average D.P. of the cellulose of the borohydride-treated pulp was 680, and the copper number of the borohydride-treated pulp was 0.6. Copper number was determined using Weyerhaeuser Test Number PPD3.

Although, in the present example, the acid-treated pulp was dried before borohydride treatment, a never-dried pulp can be treated with sodium borohydride in order to reduce the copper number. Other process conditions, such as pH, temperature and pulp consistency can be adjusted to give desirable results.

EXAMPLE 3

Reduction of Copper Number By Treatment With Sodium Hydroxide

Sixty grams of the dry, acid-treated pulp of Example 1 was mixed with a 1.38% aqueous solution of sodium hydroxide. The volume of the pulp and sodium hydroxide mixture was two liters. The pulp and sodium hydroxide mixture was incubated in an oven at a temperature of 70° C. for two hours and then washed with distilled water until the pH was in the range of pH 5.0 to pH 7.0. The copper number of the sodium hydroxide-treated pulp was 1.1. The copper number of the acid-treated pulp, before sodium hydroxide treatment, was 1.9.

EXAMPLE 4

Steam Treatment of Pulp

The average D.P. of the cellulose of never-dried Kraft pulp NB 416 was reduced, without substantially reducing the hemicellulose content, by steam treatment in the following manner. The average cellulose D.P. of the starting NB 416 pulp was about 1400 and the hemicellulose content was 13.6%. Three hundred and fifty grams of never-dried NB 416 Kraft pulp was adjusted to pH 2.5 by adding sulfuric acid. The consistency of the acidified pulp was 25% to 35%, i.e., 25% to 35% of the volume of the acidified pulp was pulp, and the rest was water. The acidified pulp was added to a steam vessel. The steam pressure was increased to between 185 to 225 p.s.i.g within two seconds and the pulp was maintained within that pressure range for two minutes. After steam treatment the viscosity, as measured by the falling ball test, was 23 cP (centipoise) which corresponds to an average D.P. of the pulp cellulose of about 700. The yield of the steam-treated pulp was 99%±0.1%. The extremely high yield of the foregoing steam treatment process indicates that almost no pulp material (less than 1.1%), including hemicellulose, was lost during steam treatment.

EXAMPLE 5

Carboxyl Content of Pulp Treated with Acid 422 grams of never-dried NB 416 pulp were acid hydrolyzed in 5% sulfuric acid at 93° C. for three hours, according to the procedure set forth in Example 2. The acid-hydrolyzed pulp was treated with sodium borohydride as described in Example 2. The carboxyl content of the treated pulp was 11.1 $\mu$mol/g, and the Cuen viscosity was 315 ml/g. Both carboxyl content and viscosity were measured by means of proprietary assays performed by Thuringisches Institut fur Textil-und Kunstoff Forschunge. V., Breitscheidstr. 97, D-07407 Rudolstadt, Germany.

EXAMPLE 6

Dissolution Time In Tertiary Amine Solvent of Pulp Treated with Acid or Steam The effect of acid or steam treatment on the rate of dissolution of NB 416 pulp in NMMO was assessed in the following manner. Two and a half kilograms of dried NB 416 were mixed with a 5.3% stock solution of sulfuric acid to yield a total volume of 13.5 liters. The average cellulose D.P. of the starting NB 416 pulp was about 1400 and the hemicellulose content was 13.6%. The acid was preheated to 92° C. and the acid plus pulp mixture was heated to 90° C. before being incubated in an oven at 73° C. to 91° C. for two hours. The acid-treated pulp was then washed until the pH of the treated pulp was in the range of pH 5.0 to pH 7.0. The copper number of the treated pulp was reduced by treatment with sodium borohydride. The copper number of the acid-treated pulp was 2.45 which was reduced to 1.2 by borohydride treatment. The average D.P. of the treated pulp cellulose after acid and borohydride treatment was 570.

The dissolution time of the steam-treated pulp of Example 4 was also measured. The viscosity of the steam treated pulp was 23 cP. The acid-treated and steam-treated pulps were separately dissolved in NMMO at 80° C. to 100° C. to yield a 0.6% solution of cellulose without minimum stirring. The time for complete dissolution of the pulps was observed by light microscopy at a magnification of 40x to 70x. The times taken for complete dissolution of the acid-treated and steam-treated pulps are set forth in Table 1. For comparison, Table 1 also shows the dissolution time of untreated NB 416 (NB 416).

TABLE 1

| Pulp | Time for Complete Dissolution |
| --- | --- |
| NB 416 | >1.6 hour |
| Acid treated NB 416 | 15 minutes |
| Steam treated NB 416 pulp | 1 hour |

EXAMPLE 7

Average Number of Gelatinous Particles Found in Pulp Treated with Acid

The number of gelatinous particles present in the dissolved, acid-treated pulp prepared as described in Example 6 was measured using a proprietary laser scattering assay performed by Thuringisches Institut fur Textil-und Kunstoff Forschunge. V., Breitscheidstr. 97, D-07407 Rudolstadt, Germany. The results of the assay are presented in Table 2.

TABLE 2

| | |
| --- | --- |
| Total Particle Content of Acid-Treated Pulp | 10–104 ppm |
| Percentage of Particles Having Diameter Less Than 12 Microns | 20–50% |
| Percentage of Particles Having Diameter in the Range of 12–40 Microns | 40–50% |
| Percentage of Particles Having Diameter Greater Than 40 Microns | 3–20% |

EXAMPLE 8

Physical Properties of Acid-Treated Pulp

NB 416 Kraft pulp was acid hydrolyzed as set forth in Example 2. Table 3 discloses various physical properties of the NB 416 pulp, and sheets made from the NB 416 pulp, before and after acid treatment. The analytical methods are proprietary Weyerhaeuser test methods.

TABLE 3

| Analytical Method | Property | NB416 | NB416, acid treated |
| --- | --- | --- | --- |
| P-045-1 | Basis weight (g/m$^2$) | 64.79 | 65.59 |
| P-045-1 | Caliper (mm) | 0.117840 | 0.11046 |
| P-360-1 | Density (kg/m$^3$) | 549.916 | 593.973 |
| P-360-1 | Bulk (cm$^{-3}$/g) | 1.81879 | 1.68409 |
| P-076-0 | Mullen Burst index (KN/g) | 2.1869 | 1.1095 |
| P-326-4 | Tear index, single ply (mNm$^2$/g) | 14.484 | 3.0500 |
| P-340-4 | Fiber length (mm) | 1.27/2.64/3.32 | 1.09/2.47/3.15 |
| W-090-3 | Fines, Length-weighted (% of fibers having length <0.2 mm) | 4.1 | 3.0 |
| W-090-3 | Coarseness (mg/100 meters) | 23.1 | 22.2 |
| W-090-3 | Fiber/g (×10$^6$) | 3.5 | 4.2 |
| W-105-3 | Freeness (ml) | 735 | 760 |

The data set forth in Table 3 show that when pulp treated with acid in accordance with the present invention is formed into a sheet, the sheet has a substantially lower Mullen Burst Index and Tear Index compared to the untreated pulp. Consequently, the sheets made from acid-treated pulp can be more easily broken down into small fragments, thereby facilitating dissolution of the treated pulp in a solvent such as NMMO. It is desirable to use as little force as possible to break down the treated pulp sheets because the application of a large amount of crushing or compressive force generates sufficient heat to cause hornification of the treated pulp, i.e., hardening of the treated pulp at the site of compression thereby generating relatively insoluble particles of treated pulp that may clog the orifices through which the dissolved, treated pulp is expressed to form lyocell fibers.

Fiber length is represented by a series of three values in Table 3. The first value is the arithmetic mean fiber length value; the second value is the length-weighted average fiber length value, and the third value is the weight-weighted average fiber length value. The data set forth in Table 3 show that fiber length is not substantially reduced by acid-treatment.

The fines content is expressed as the length-weighted percentage value for the percentage of pulp fibers having a length of less than 0.2 mm. The data set forth in Table 3 demonstrate that acid treatment of pulp in accordance with the present invention generates a treated pulp having a fines content that is comparable to that of the untreated pulp. A low fines content is desirable because the acid-treated and washed pulp drains more quickly when spread on a mesh screen prior to formation into a sheet. Thus, there is a saving of time and money in the sheet-forming process. It is also desirable to produce an acid-treated pulp, having a lowered cellulose D.P., without substantially reducing the pulp fiber length because it is difficult to make a sheet from treated pulp if the fiber length has been substantially reduced compared to the untreated pulp.

EXAMPLE 9

Transition Metal Content of Acid-Treated Pulp of the Present Invention

Acid treatment of pulp according to the practice of the present invention results in a treated pulp having a low transition metal content, as exemplified herein. Two and a half kilograms of dried FR-416 pulp (a paper grade pulp manufactured by Weyerhaeuser Corporation) pulp were deposited in a plastic beaker containing sixteen liters of a 1.3% solution of sulfuric acid that was preheated to a temperature of 91° C. The pulp had an average cellulose D.P. of 1200 and the hemicellulose content of the pulp was 13.6%±0.7%. The copper number of the FR 416 was about 0.5. The mixture of acid and pulp was placed in an oven and incubated at a temperature of about 90° C. for two hours. After two hours the mixture of acid and pulp was removed from the oven and was then washed with distilled water until the pH of the treated pulp was in the range of pH 5 to pH 7. The wet, acid-treated pulp was then treated with 0.5% sodium borohydride for about three hours and washed with water until the pH was in the range of pH 5 to pH 7. The average D.P. of the cellulose of the acid-treated, borohydride-reduced pulp was 690, and the hemicellulose content of the acid-treated, borohydride-reduced pulp was 14.1%±0.7%. The copper number of the acid-treated, borohydride-treated pulp was 0.9.

The copper and iron content of the treated pulp was measured using Weyerhaeuser test AM5-PULP-1/6010. The copper content of the acid-treated, borohydride-reduced pulp was less than 0.3 ppm and the iron content of the acid-treated, borohydride-reduced pulp was less than 1.3 ppm. The silica content of the acid-treated, borohydride-reduced pulp was 6 ppm as measured using Weyerhaeuser test AM5-ASH-HF/FAA.

EXAMPLE 10

Formation of Lyocell Fibers of the Present Invention by Melt Blowing

A dope was prepared from a composition of the present invention in the following manner. Two thousand three hundred grams of dried NB 416 Kraft pulp were mixed with 1.4 kilograms of a 5.0% solution of $H_2SO_4$ in a plastic container.

The consistency of the pulp was 92%. The average D.P. of the never-dried NB 416 prior to acid treatment was 1400, the hemicellulose content was 13.6% and the copper number was 0.5. The pulp and acid mixture was maintained at a temperature of 97° C. for 1.5 hours and then cooled for about 2 hours at room temperature and washed with water until the pH was in the range of 5.0 to 7.0. The average D.P. of the acid-treated pulp was about 600, as measured by method ASTM D 1795-62 and the hemicellulose content was about 13.8% (i.e., the difference between the experimentally measured D.P. of the acid-treated pulp and that of the untreated pulp was not statistically significant). The copper number of the acid-treated pulp was about 2.5.

The acid treated pulp was dried and a portion was dissolved in NMMO. Nine grams of the dried, acid-treated pulp were disssolved in a mixture of 0.025 grams of propyl gallate, 61.7 grams of 97% NMMO and 21.3 grams of 50% NMMO. The flask containing the mixture was immersed in an oil bath at about 120° C., a stirrer was inserted, and stirring was continued for about 0.5 hours until the pulp dissolved.

The resulting dope was maintained at about 120° C. and fed to a single orifice laboratory melt blowing head. Diameter at the orifice of the nozzle portion was 483 μm and its length about 2.4 mm, a L/D ratio of 5. A removable coaxial capillary located immediately above the orifice was 685 μm in diameter and 80 mm long, a L/D ratio of 116. The included angle of the transition zone between the orifice and capillary was about 118°. The air delivery ports were parallel slots with the orifice opening located equidistant between them. Width of the air gap was 250 μm and overall width at the end of the nosepiece was 1.78 mm. The angle between the air slots and centerline of the capillary and nozzle was 30°. The dope was fed to the extrusion head by a screw-activated positive displacement piston pump. Air velocity was measured with a hot wire instrument as 3660 m/min. The air was warmed within the electrically heated extrusion head to 60–70° C. at the discharge point. Temperature within the capillary without dope present ranged from about 80° C. at the inlet end to approximately 140° C. just before the outlet of the nozzle portion. It was not possible to measure dope temperature in the capillary and nozzle under operating conditions. When equilibrium running conditions were established a continuous fiber was formed from each of the dopes. Throughputs were varied somewhat in an attempt to obtain similar fiber diameters with each dope but all were greater than about 1 g of dope per minute. Fiber diameters varied between about 9–14 μm at optimum running conditions.

A fine water spray was directed on the descending fiber at a point about 200 mm below the extrusion head and the fiber was taken up on a roll operating with a surface speed about ¼ the linear speed of the descending fiber.

A continuous fiber in the cotton denier range could not be formed when the capillary section of the head was removed. The capillary appears to be very important for formation of continuous fibers and in reduction of die swell.

It will be understood that fiber denier is dependent on many controllable factors. Among these are solution solids content, solution pressure and temperature at the extruder head, orifice diameter, air pressure and other variables well known to those skilled in melt blowing technology. Lyocell fibers having deniers in the cotton fiber range (about 10–20 μm in diameter) were easily and consistently produced by melt blowing at throughput rates greater than about 1 g/min of dope per orifice. A 0.5 denier fiber corresponds to an average diameter (estimated on the basis of equivalent circular cross section area) of about 7–8 μm.

The melt blown fibers were studied by x-ray analysis to determine degree of crystallinity and crystallite type. Comparisons were also made with some other cellulosic fibers as shown in the following Table 4.

TABLE 4

Crystalline Properties of Different Cellulose Fibers

| Fibers | Lyocell of Present Invention | TENCEL ® Lyocell Fiber | Cotton |
| --- | --- | --- | --- |
| Crystallinity Index | 67% | 70% | 85% |
| Crystallite | Cellulose II | Cellulose II | Cellulose I |

Some difficulty and variability was encountered in measuring tensile strength of the individual fibers so the numbers given in the following table (Table 5) for tenacity are estimated averages. Again, the fibers of the present invention are compared with a number of other fibers as seen in Table 5.

TABLE 5

Fiber Physical Property Measurements

| Fibers | Cotton | So. Pine | Rayon[1] | Silk | Melt Blown Lyocell[2] | TENCEL ® Lyocell Fiber |
| --- | --- | --- | --- | --- | --- | --- |
| Typical Length, cm | 4 | 0.35 | 40 | >104 | Continuous | Variable |
| Typical Diam., μm | 20 | 40 | 16 | 10 | 9-15 | 12 |
| Tenacity, g/d | 2.5–3.0 | — | 0.7–3.2 | 2.8–5.2 | 2–3 | 4.5–5.0 |

[1]Viscose process.
[2]Made with 600 D.P. acid-treated pulp of Example 10.

EXAMPLE 11

Formation of Lyocell Fibers of the Present Invention by a Dry Jet/Wet Process Dope was prepared from acid-treated pulp of the present invention (hemicellulose content of 13.5% and average cellulose D.P. of 600). The treated pulp was dissolved in NMMO and spun into fibers by a dry/jet wet process as disclosed in U.S. patent Ser. No. 5,417,909, which is incorporated herein by reference. The dry jet/wet spinning procedure was conducted by Thuringisches Institut fur Textil- und Kunstoff Forschunge. V., Breitscheidstr. 97, D-07407 Rudolstadt, Germany. The properties of the fibers prepared by the dry jet/wet process are summarized in Table 6 which also discloses the properties of the following types of fibers for comparison: lyocell fibers made by meltblowing (made from the dope of Example 10); rayon and cotton.

TABLE 6

Structure and properties of dry jet wet fibers

| Property | Lyocell Centrifugal | Lyocell Melt-blowing | Lyocell (Dry jet wet) | Rayon | Cotton | TENCEL ® Lyocell Fiber |
|---|---|---|---|---|---|---|
| Crystallinity Index | 67% | 67–73% | — | 35–40% | 85% | 70–78% |
| Orientation (Birefringence) | 0.039 | 0.026–0.04 | — | 0.026–0.032 | 0.044 | 0.046–0.051 |
| Strength (g/d) | 2.1 | 2–3 | 37.5 cN/tex | 0.7–3.2 | 2.5–3.0 | 4.5–5.0 |
| Dry Elongation | — | 10% | 14.0% | 20–25% | 10% | 14–16% |
| Water Imbibition | | 115% | | | | 72% |

EXAMPLE 12

Average D.P. of Cellulose of Meltblown Lyocell Fibers of the Present Invention

Meltblown lyocell fibers were prepared according to Example 10, from the acid-treated pulp of Example 10, and the average D.P. of the cellulose of the meltblown fibers was measured using Test ASTM D 1795–62. The data set forth in Table 7 shows that the average D.P. of the lyocell fiber cellulose is approximately 10% less than the average D.P. of the treated pulp cellulose.

TABLE 7

Average D.P. of Cellulose of Meltblown Lyocell Fibers

|  | Average D.P. cellulose |
|---|---|
| Treated Pulp | 600 |
| Fibers | 520 |

EXAMPLE 13

Hemicellulose Content of Meltblown Lyocell Fibers of the Present Invention

Meltblown lyocell fibers were prepared according to Example 10, from the acid-hydrolyzed NB 416 pulp of Example 10, and the hemicellulose content of the meltblown fibers was measured using a proprietary Weyerhaeuser sugar analysis test. The data set forth in Table 8 shows that the hemicellulse content of the lyocell fiber is approximately 20% less than the hemicellulose content of the pulp cellulose.

TABLE 8

Hemicellulose of Lyocell Fibers

|  | Wt. % hemicellulose |
|---|---|
| Treated Pulp | 13.0 |
| Fibers | 10.0 |

EXAMPLE 14

Reflectance of Lyocell Fibers of the Present Invention

The pebbled surface of the preferred fibers of the present invention produced by melt blowing and centrifugal spinning results in a desirable lower gloss without the need for any internal delustering agents. While gloss or luster is a difficult property to measure the following test is exemplary of the differences between a melt blown fiber sample made using the the acid-treated dope of Example 10 and TENCEL®, a commercial lyocell fiber produced by Courtaulds.

Small wet formed handsheets were made from the respective fibers and light reflectance was determined according to TAPPI Test Method T480-om-92. Reflectance of the handsheet made from meltblown lyocell fiber of the present invention was 5.4% while reflectance of the handsheet made from Tencel® was 16.9%.

EXAMPLE 15

Dye-Absorptive Capacity of Lyocell Fibers of the Present Invention

The fibers of the present invention have shown an unusual and very unexpected affinity for direct dyes. Samples of the melt blown fibers made from the acid-treated dope of Example 10 were carded. These were placed in dye baths containing Congo Red, Direct Blue 80, Reactive Blue 52 and Chicago Sky Blue 6B, along with samples of undyed commercial lyocell fibers, TENCEL® fibers and Lenzing Lyocell fibers. The color saturation of the dyed, melt blown fibers was outstanding in comparison to that of TENCEL® fibers and Lenzing Lyocell fibers used for comparison. It appears that quantitative transfer of dye to the fiber is possible with the fibers of the invention.

EXAMPLE 16

Yarn made from Melt Blown Lyocell Fibers of the Present Invention

Fiber made from the 600 D.P. acid-treated dope of Example 10 was removed from a take-up roll and cut by hand into 38–40 mm staple length. The resultant fiber bundles were opened by hand to make fluffs more suitable for carding. The tufts of fiber were arranged into a mat that was approximately 225 mm wide by 300 mm long and 25 mm thick. This mat was fed into the back of a full size cotton card set for cotton processing with no pressure on the crush rolls. Using a modified feed tray the card sliver was arranged into 12 pieces of equal lengths. Since the card sliver weight was quite low, this was compensated for on the draw frame. Two sets of draw slivers were processed from the card sliver. These sets were broken into equal lengths and placed on the feed tray. This blended all the sliver produced into one finish sliver. A rotor spinning machine was used to process the finish sliver into yarn. The rotor speed was 60,000 rpm with an 8,000 rpm combing roll speed. The yarn count was established as between 16/1 and 20/1. The machine was set up with a 4.00 twist multiple. The yarn was later successfully knitted on a Fault Analysis Knitter with a 76 mm cylinder.

EXAMPLE 17

Reduction of Copper Number by Treatment with Bleaching Agents

The copper number of acid-treated pulp of the present invention was reduced by treatment with bleaching agents as described herein. Two and a half kilograms of air dried, new NB416 pulp (hemicellulose content of 15.9% as determined using a proprietary Weyerhaeuser sugar analysis test) was mixed with 14 liters of 5% $H_2SO_4$ and incubated at 89° C. for 3 hours, and then cooled down to about 60° C. The acid-treated pulp (hemicellulose content of 15.4% as determined using a proprietary Weyerhaeuser sugar analysis test) was then washed until the pH was within the range of pH 5–7. The acid-treated pulp had an average DP of 399 (as determined using Tappi method T230) and a copper number of 3.3 (as determined by Weyerhaeuser test number PPD-3). The copper number of samples of the foregoing, acid-treated pulp was reduced using three different bleaching agents as described herein.

The aforedescribed acid-treated pulp (having a copper number of 3.3 and an average DP of 399) was oven dried and 13 grams of the oven dried, acid-treated pulp were mixed with a solution of 1.0% NaOCl (sodium hypochlorite) and 0.5% NaOH at a temperature of 45° C. for 3 hours. The NaOCl treated pulp had a copper number of 1.6, and an average DP of 399 (as determined using Tappi method T230).

Fifty grams of the air-dried, acid-treated pulp of Example 6 (having a copper number of 2.2 and an average DP of about 520) were mixed with 500 ml of a solution of 1.6% borol at a temperature of 60° C. for 2 hours. Borol is a 50% NaOH solution containing 12% sodium borohydrate. The borol-treated pulp had a copper number of 0.86, while the average DP of the pulp was about 600 (cellulose D.P. was measured using Tappi method T230).

EXAMPLE 18

Solution Thermal Stability of Pulp With or Without $NaBH_4$ Treatment

The effect of reducing the copper number of acid-treated pulp of the present invention on the thermal stability of a solution of the acid-treated pulp in NMMO was investigated in the following manner. Acid-treated pulp from Example 17, having a copper number of 3.3, was treated with 1% $NaBH_4$ according to Example 2. The copper number of the borohydride-treated pulp was 1.0 (as measured using Weyerhaeuser test number PPD-3), and the average D.P. of the borohydride-treated pulp was 418. A 4.6% solution of the borohydride-treated pulp (having a copper number of 1.0) was prepared in NMMO. Similarly, a 4.5% solution of the acid-treated pulp (having a copper number of 3.3) from Example 17 was prepared in NMMO. In both cases, the solutions were prepared at 98° C. No antioxidant was added to the solutions.

Figure 17:
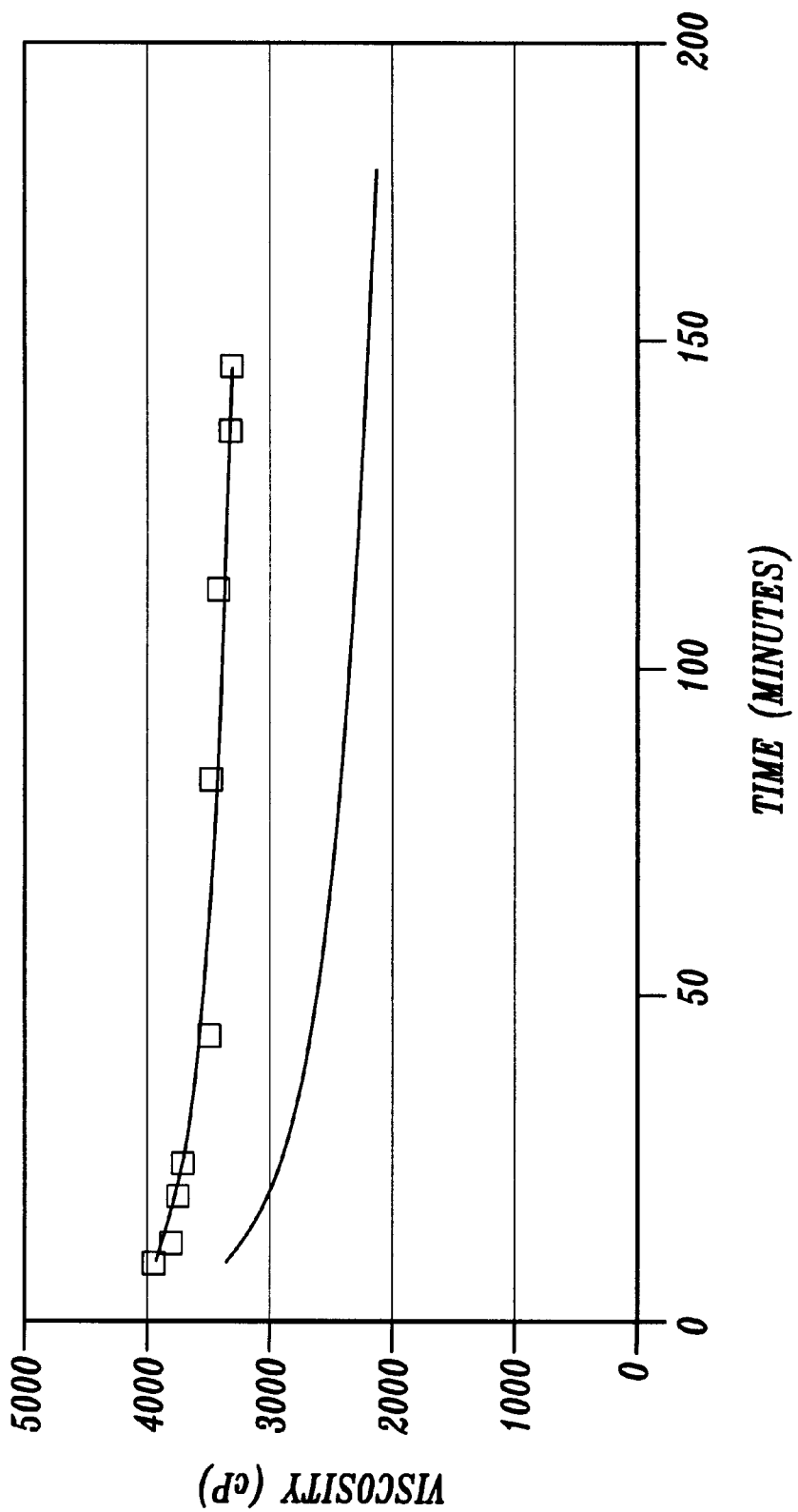
FIG. 17 is a graph showing solution thermal stability of acid-treated pulps of the present invention having either low or high copper number.

The solution viscosity of each of the two pulp solutions was measured using a Brookfield viscometer for a period of about 3-hour (shear rate: 100 rad/minute). The curves depicting solution viscosity versus dissolution time for each of the two pulp solutions are shown in FIG. 17 and reveal that borohydride-treated pulp (upper graph shown in FIG. 17) has higher thermal stability than the same acid-treated pulp without borohydride treatment (lower graph shown in FIG. 17).

These results demonstrate that reducing the copper number of acid-treated pulp of the present invention, prior to dissolving the treated pulp in NMMO to form a dope, improves the thermal stability of the dope.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A pulp comprising:
   a treated Kraft pulp comprising:
   (a) at least 7% by weight hemicellulose;
   (b) cellulose having an average degree of polymerization of from about 200 to about 1100; and
   (c) a copper number of less than about 2.0.

2. The pulp of claim 1 wherein said treated Kraft pulp is produced from wood.

3. The pulp of claim 2 wherein the treated Kraft pulp is produced from at least one softwood tree species selected from the group consisting of fir, pine, spruce, larch, cedar, and hemlock.

4. The pulp of claim 2 wherein the treated Kraft pulp is produced from at least one hardwood tree species selected from the group consisting of acacia, alder, aspen, oak, gum, eucalyptus, poplar, gmelina and maple.

5. The pulp of claim 1 wherein the treated Kraft pulp comprises cellulose having an average degree of polymerization of from about 300 to about 1100, and from 7% by weight to about 30% by weight hemicellulose.

6. The pulp of claim 1 wherein the treated Kraft pulp comprises cellulose having an average degree of polymerization of from about 300 to about 1100, and from about 7% by weight to about 20% by weight hemicellulose.

7. The pulp of claim 1 wherein the treated Kraft pulp comprises cellulose having an average degree of polymerization of from about 400 to about 700, and from about 10% by weight to about 17% by weight hemicellulose.

8. The pulp of claim 1 wherein the distribution of treated Kraft pulp cellulose D.P. values is unimodal.

9. The pulp of claim 1 wherein the treated Kraft pulp has a copper number less than about 1.1.

10. The pulp of claim 1 wherein the treated Kraft pulp has a copper number less than about 0.7.

11. The pulp of claim 1 wherein the kappa number of the treated Kraft pulp is less than 1.0.

12. The pulp of claim 1 wherein the treated Kraft pulp has a carbonyl content of less than about 120 $\mu$mol/g.

13. The pulp of claim 1 wherein the treated Kraft pulp has a carboxyl content of less than about 120 $\mu$mol/g.

14. The pulp of claim 1 wherein the treated Kraft pulp has a total transition metal content of less than 20 ppm.

15. The pulp of claim 14 wherein the total transition metal content is less than 5 ppm.

16. The pulp of claim 1 wherein the treated Kraft pulp has an iron content of less than 4 ppm.

17. The pulp of claim 1 wherein the treated Kraft pulp has a copper content of less than 1.0 ppm.

18. The pulp of claim 1 wherein the treated Kraft pulp is capable of fully dissolving in NMMO in less than about 20 minutes utilizing the dissolution procedure set forth in Example 6.

19. The pulp of claim 1 wherein the treated Kraft pulp has a length-weighted percentage of fibers, of length less than 0.2 mm, of less than 4%.

20. The pulp of claim 1 having a silica content of less than 40 ppm.

21. The pulp of claim 1 being in a form that is adapted for storage or transportation.

22. The pulp of claim 21, said pulp being in a form selected from the group consisting of a sheet, a roll and a bale.

23. The pulp of claim 22, said pulp being in the form of a sheet having a Mullen Burst Index of less than about 2.0 kN/g.

24. The pulp of claim 23 wherein the Mullen Burst Index is less than about 1.2 kN/g.

25. The pulp of claim 24, said pulp having a Tear Index of less than 4 mNm$^2$/g.

26. A pulp comprising:

a treated Kraft wood pulp comprising:
- (a) at least 7% by weight hemicellulose;
- (b) a kappa number less than two;
- (c) cellulose having an average degree of polymerization of from about 200 to about 1100; and
- (d) said cellulose having individual D.P. values that are distributed unimodally.

27. A pulp comprising:

a treated Kraft pulp comprising:
- (a) at least 7% by weight hemicellulose;
- (b) cellulose having an average degree of polymerization of from about 200 to about 1100;
- (c) a kappa number less than two; and
- (d) a copper number less than 0.7.

28. A pulp comprising:

a treated Kraft pulp comprising:
- (a) at least 7% by weight hemicellulose;
- (b) cellulose having an average degree of polymerization of from about 200 to about 1100;
- (c) a kappa number less than two;
- (d) an iron content less than 4 ppm; and
- (e) a copper content less than 1.0 ppm.

29. A pulp comprising:

a treated Kraft pulp comprising:
- (a) at least 7% by weight hemicellulose;
- (b) cellulose having an average degree of polymerization of less than 1100; and
- (c) a lignin content of about 0.1% by weight.

* * * * *